United States Patent
Kang et al.

(10) Patent No.: US 9,944,856 B2
(45) Date of Patent: Apr. 17, 2018

(54) LIQUID CRYSTAL DISPLAY PANEL, METHOD FOR MANUFACTURING THE SAME AND LIQUID CRYSTAL COMPOSITION

(71) Applicants: Samsung Display Co., LTD., Yongin, Gyeonggi-Do (KR); INDUSTRIAL COOPERATION FOUNDATION CHONBUK NATIONAL UNIVERSITY, Jeonju-si, Jeollabuk-do (KR)

(72) Inventors: Shin Woong Kang, Jeonju-si (KR); Kundu Sudarshan, Jeonju-si (KR); Byung Wook Ahn, Seoul (KR); Keun Chan Oh, Cheonan-si (KR); Chang Hun Lee, Hwaseong-si (KR); Soon Joon Rho, Suwon-si (KR); Jae Jin Lyu, Yongin-si (KR)

(73) Assignees: Samsung Display Co., LTD., Yongin (KR); INDUSTRIAL COOPERATION FOUNDATION CHONBUK NATIONAL UNIVERSITY, Jeonju-si (KR)

(*) Notice: Subject to any disclaimer, the term of this patent is extended or adjusted under 35 U.S.C. 154(b) by 168 days.

(21) Appl. No.: 14/744,967

(22) Filed: Jun. 19, 2015

(65) Prior Publication Data
US 2016/0208173 A1    Jul. 21, 2016

(30) Foreign Application Priority Data
Jan. 16, 2015 (KR) .................. 10-2015-0007819

(51) Int. Cl.
- C09K 19/00 (2006.01)
- C09K 19/56 (2006.01)
- G02F 1/1337 (2006.01)

(52) U.S. Cl.
CPC ............ *C09K 19/56* (2013.01); *G02F 1/1337* (2013.01); *G02F 1/133711* (2013.01); *Y10T 428/10* (2015.01); *Y10T 428/1005* (2015.01)

(58) Field of Classification Search
CPC ............ G02F 1/1337; G02F 1/133711; G02F 1/133756; G02F 1/13378; G02F 1/133784; G02F 1/133788; G02F 1/1341; G02F 2001/133738; G02F 2001/133742; C09K 19/56; C08G 73/1039; C08G 18/5015;
(Continued)

(56) References Cited

U.S. PATENT DOCUMENTS

| | | | | |
|---|---|---|---|---|
| 5,173,342 A * | 12/1992 | Sato | .................. | G02F 1/133719 349/123 |
| 5,325,219 A * | 6/1994 | Hanyu | ............... | C08G 73/1039 349/135 |
| 6,569,972 B1 * | 5/2003 | Choi | ...................... | C09K 19/56 526/245 |

FOREIGN PATENT DOCUMENTS

| | | |
|---|---|---|
| KR | 1020070072838 A | 7/2007 |
| KR | 1020080003298 A | 1/2008 |

\* cited by examiner

*Primary Examiner* — Ruiyun Zhang
(74) *Attorney, Agent, or Firm* — H.C. Park & Associates, PLC

(57) ABSTRACT

An LCD panel, comprises substrates facing each other, a liquid crystal layer disposed between the substrates and liquid crystal alignment layers, each sandwiched between the liquid crystal layer and a respective one of the substrates, wherein the liquid crystal alignment layers comprises hydrocarbon derivative having perfluorocarbon group.

6 Claims, 32 Drawing Sheets
(14 of 32 Drawing Sheet(s) Filed in Color)

(58) Field of Classification Search
CPC .............. C08G 65/007; Y10T 428/10; Y10T 428/1005; Y10T 428/1027
USPC ....... 428/1.1, 1.2, 1.23, 1.26, 1.27; 526/245, 526/246, 247; 522/153, 156; 528/70
See application file for complete search history.

LIQUID CRYSTAL DISPLAY PANEL, METHOD FOR MANUFACTURING THE SAME AND LIQUID CRYSTAL COMPOSITION

This application claims the priority of and all the benefits accruing under 35 U.S.C. § 119 from Korean Patent Application No. 10-2015-0007819 filed on Jan. 16, 2015 in the Korean Intellectual Property Office (KIPO), the disclosure of which is incorporated herein by reference in its entirety.

BACKGROUND OF THE INVENTION

Field of the Invention

The present disclosure relates to a LCD panel, a method for manufacturing the same and a liquid crystal composition. More specifically, the present disclosure relates to a LCD panel including hydrocarbon derivative having perfluorocarbon group, a method for manufacturing a LCD panel in which a liquid-crystal alignment film is formed by injecting a liquid crystal composition and then performing light irradiation without performing traditional coating, drying and firing processes, and a liquid crystal composition containing liquid crystal molecules and liquid crystal alignment inducing agent.

Description of the Related Art

An LCD (liquid crystal display) device comprises an LCD panel composed of display substrates facing each other and a liquid crystal layer sandwiched therebetween.

An LCD panel itself does not emit light and thus requires a light source for illuminating the panel at the back of the panel. The transmittance of the light supplied to the LCD panel from the light source is adjusted depending on the orientation of liquid crystal molecules in its liquid crystal layer.

A known technique for aligning the liquid crystal molecules vertically with respect to the surfaces of the display substrates employs liquid crystal alignment films, which are produced by way of coating the surfaces of the display substrates with a polymer organic compound or an inorganic compound such as silicon oxide to form a thin film, and then performing processes such as drying and firing it. Typically, a polyimide-based, vertical alignment thin-film is used as the liquid crystal alignment film.

To produce such a polyimide-based thin-film, a series of processes has to be carried out, involving a process of coating the display substrates with a liquid agent for liquid crystal alignment, which is composed of a polyimide-based compound, a process of drying and a process of high-temperature firing. Such a series of processes, however, results in low productivity. Therefore, required are simpler processes of producing a liquid crystal alignment film for better productivity.

SUMMARY OF THE INVENTION

Aspects of the present invention provide a method for manufacturing a LCD panel with improved productivity.

Aspects of the present invention also provide a LCD panel capable of improving uniformity, stability and reliability of liquid crystal molecules orientation.

Aspects of the present invention also provide a liquid crystal composition containing a liquid crystal alignment inducing agent as an additive agent.

These and other aspects, embodiments and advantages of the present invention will become immediately apparent to those of ordinary skill in the art upon review of the Detailed Description and Claims to follow.

According to one aspect of the present invention, there is provided an LCD panel, comprising, substrates facing each other, a liquid crystal layer disposed between the substrates and liquid crystal alignment layers, each sandwiched between the liquid crystal layer and a respective one of the substrates, wherein the liquid crystal alignment layers comprises hydrocarbon derivative having perfluorocarbon group.

According to another aspect of the present invention, there is provided a method for manufacturing an LCD panel, the method comprising, disposing a first substrate and a second substrate such that they face each other, injecting a liquid crystal composition containing liquid crystals and hydrocarbon derivative having perfluorocarbon group between the first substrate and the second substrate and irradiating the liquid crystal composition with UV ray.

According to yet another aspect of the present invention, there is provided a liquid crystal composition comprising, liquid crystals and hydrocarbon derivative having perfluorocarbon group.

According to the present disclosure, a liquid crystal alignment film for inducing alignment of liquid crystal molecules can be produced simply by injecting hydrocarbon derivative having perfluorocarbon group together with liquid crystal molecules between upper and lower substrates or by dropping it onto the upper and lower substrates and then to perform light irradiation. Therefore, a series of traditional processes of coating the upper and lower substrates with polymer liquid crystal alignment agent and of drying and firing can be eliminated, improving productivity and process efficiency.

Further, since high-temperature processes required in the existing process of firing a polymer alignment film is not necessary, LCD devices employing flexible organic polymer substrates vulnerable to high-temperature process can be easily fabricated.

It should be noted that effects of the present invention are not limited to those described above and other effects of the present invention will be apparent to those skilled in the art from the following descriptions.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components.

This patent or application file contains at least one drawing executed in color. Copies of this patent or patent application publication with color drawing(s) will be provided by the USPTO upon request and payment of the necessary fee.

FIG. 15 is a conoscopy image of the LCD panel;

DETAILED DESCRIPTION OF THE INVENTION

Figure 1:
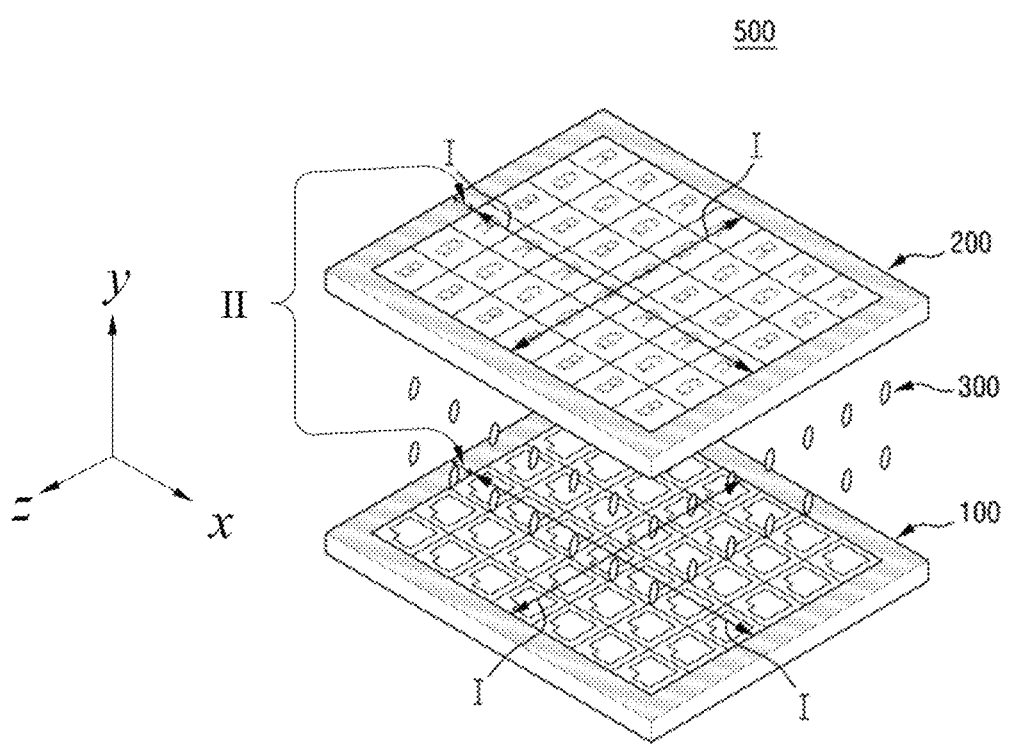
FIG. 1 is a view showing a layout of an LCD panel according to an exemplary embodiment of the present disclosure.

Features of the inventive concept and methods of accomplishing the same may be understood more readily by reference to the following detailed description of preferred embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer, or one or more intervening elements or layers may be present. In contrast, when an element is referred to as being "directly on," "directly connected to" or "directly coupled to" another element or layer, there are no intervening elements or layers present. As used herein, connected may refer to elements being physically, electrically, operably, and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration. As used herein, the terms "use," "using," and "used" may be considered synonymous with the terms "utilize," "utilizing," and "utilized," respectively.

In the following descriptions, the present disclosure will be described in detail with reference to exemplary embodiments and comparative examples.

FIG. 1 is an exploded perspective view for schematically illustrating a liquid crystal display panel 500 according to an exemplary embodiment of the present disclosure.

Referring to FIG. 1, the LCD panel 500 may include a first display substrate 100, a second display substrate 200 spaced apart from and facing the first display substrate 100, and a liquid crystal layer 300 interposed between the first display substrate 100 and the second display substrate 200. Each of the display substrates 100 and 200 includes a display area (I) and a non-display area (II). In the display area (I), a plurality of pixels may be defined that is arranged in a matrix. The non-display area (II) may be a perimeter area surrounding the display area (I).

The liquid crystal layer 300 may include liquid crystal molecules, the directors of which are aligned vertically with respect to the display substrates 100 and 200, with a pretilt angle.

FIGS. 2 to 8 are cross-sectional views for illustrating a method for manufacturing the LCD panel 500 shown in FIG. 1 according to the exemplary embodiment of the present disclosure.

Figure 2:
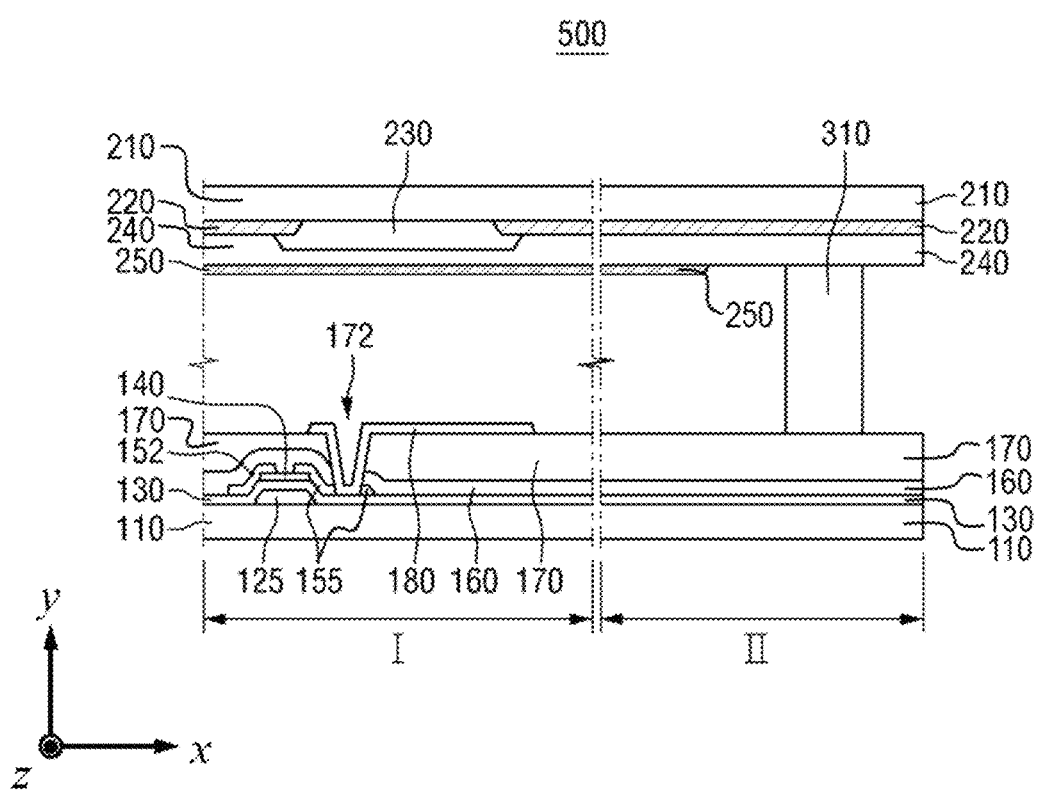
FIGS. 2 to 8 are cross-sectional views for schematically illustrating a series of processes of a method for manufacturing the LCD panel shown in FIG. 1, according to an exemplary embodiment of the present disclosure.

Referring to FIG. 2, each of the display substrates 100 and 200 will be described in detail.

In the display area (I) of the first display substrate 100, a plurality of gate lines extending in a first direction, and a plurality of data lines extending in a second direction perpendicular to the first direction may be formed. In each of pixels defined by the gate lines and the data lines, a pixel electrode 180 may be disposed. The pixel electrode 180 may receive a data voltage via a thin-film transistor working as a switching element. A gate electrode 125 of the thin-film transistor, i.e., a control terminal may be connected to the gate line, a source electrode 152 thereof, i.e., an input terminal may be connected to the data line, and a drain electrode 155 thereof, i.e., an output terminal may be connected to the pixel electrode 180 via a contact. A channel of the thin-film transistor may be formed as a semiconductor layer 140. The semiconductor layer 140 may be disposed so that it overlaps the gate electrode 125. The source electrode 152 may be spaced apart from the drain electrode 155 with the semiconductor layer 140 therebetween. The pixel electrode 180, along with a common electrode 250, may generate electric field so as to control orientations of liquid crystal molecules in a liquid crystal layer 300 interposed therebetween.

In the non-display area (II) of the first display substrate 100, a driving unit may be disposed that applies a gate driving signal, a data driving signal and the like to each pixel in the display area (I).

In the display area (I) of the second display substrate 200, a color filter 230 may be formed in each pixel. The color filter 230 may include a red, green or blue color filter 230. The red, green, blue color filters 230 may be arranged in a repeated order. At a boundary between every two color filters 230, a shield pattern 220 may be disposed. Further, the shield pattern 220 may be extended to the non-display area (II) of the second display substrate 200. The shield pattern 220 in the non-display area (II) may be wider than the shield pattern 220 formed at a boundary between the color filters 230. On the front face of the display area (I), a common electrode 250 may be disposed across pixels, as a single piece.

The first display substrate 100 and the second display substrate 200 may be bonded together with a sealing member 310 made of sealent or the like. The sealing member 310 may be a perimeter area around the first display substrate 100 and the second display substrate 200, and may be disposed in the non-display areas (II).

The first display substrate 100 may have a first substrate 110 as its base substrate. The first substrate 110 may include the display area (I) and the non-display area (II). The first substrate 110 may be made of a transparent, insulative substrate such as glass or transparent plastic.

On the first substrate 110 in the display area (I), gate lines made of a conductive material, and gate electrodes 124 protruding from the gate lines are formed. Although not shown in the drawings, the gate lines may be extended to the non-display area (II) to thereby form gate pads in the non-display area (II).

The gate lines and the gate electrodes 125 are covered by a gate insulating film 130. The gate insulating film 130 is extended to the non-display area (II).

On the gate insulating film 130 in the display area (I), a semiconductor layer 140 and an ohmic contact layer (not shown) may be formed. On the semiconductor layer 140 and the ohmic contact layer, a source electrode 152 branching off from the data line, and a drain electrode 155 spaced apart from the source electrode 152 may be formed. Although not shown in the drawings, the data line may be extended to the non-display area (II) to thereby form a data pad in the non-display area (II).

On the source electrode 152 and the drain electrode 155, a passivation film 160 may be formed that is a type of insulating film made of an insulative material, such as silicon nitride film, silicon oxide film and silicon oxynitride film. On the passivation film 160, an organic film 170 made of an organic material made be formed. The passivation film 160 and the organic film 170 may be extended to the non-display area (II). The passivation film 160 may be eliminated from the configuration.

On the organic film 170 in the display area (I), a pixel electrode 180 made of a conductive material may be disposed in every pixel. The pixel electrode 180 may be electrically connected to the drain electrode 155 via a contact hole 172 that penetrates the organic film 170 and the passivation film 160 to expose the drain electrode 155. The pixel electrode 180 may be made of indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, an alloy or a stacked film thereof. Although not shown in the drawings, the pixel electrode 180 may include a slit or an opening in the display area (I). The slit or opening may be patterned to have a predetermined shape, such as a pattern of islands, sprites or fish bones.

Subsequently, the second display substrate 200 will be described. The second display substrate 200 may have a second substrate 210 as its base substrate. The second substrate 210 may be made of a transparent, insulative substrate such as glass or transparent plastic.

On the second substrate 210, a shield pattern 220 is formed. The shield pattern 220 may be extended to the non-display area (II).

On the shield pattern 220 in the display area (I), a color filter 230 may be formed.

On the color filter 230 and the shield pattern 220, an overcoat layer 240 may be formed. The overcoat layer 240 may be extended to the non-display area (II).

On the overcoat layer 240, the common electrode 250 may be disposed. The common electrode 250 may be made of indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, an alloy or a stacked film thereof.

The common electrode 250 may be formed to cover the entirety of the display area (I). Although not shown in the drawings, the common electrode 250 may include a slit or an opening in the display area (I). The slit or opening may be patterned to have a predetermined shape, such as a pattern of islands, sprites or fish bones.

The common electrode 250 may be formed on a part of the non-display area (II) but is not formed at the edge of the second display substrate 200, so that the overcoat layer 240 may be exposed.

In the non-display area (II) of the LCD panel 500, the sealing member 310 made of a sealent or the like is formed. The sealing member 310 is formed along the edge of the display area (I) to surround the display area (I). Accordingly, the first display substrate 100 and the second display substrate 200 are bonded together by the sealing member 310, and a cell gap can be defined therebetween. The first display substrate 100 and the second display substrate 200 are disposed facing each other with the cell gap therebetween.

The first display substrate 100 and the second display substrate 200 may be bonded together by way of placing the pixel electrode 180 of the first display substrate 100 and the common electrode 250 of the second display substrate 200 such that they face each other and then bonding them with the sealing member 310 made of a sealent or the like.

Figure 3:
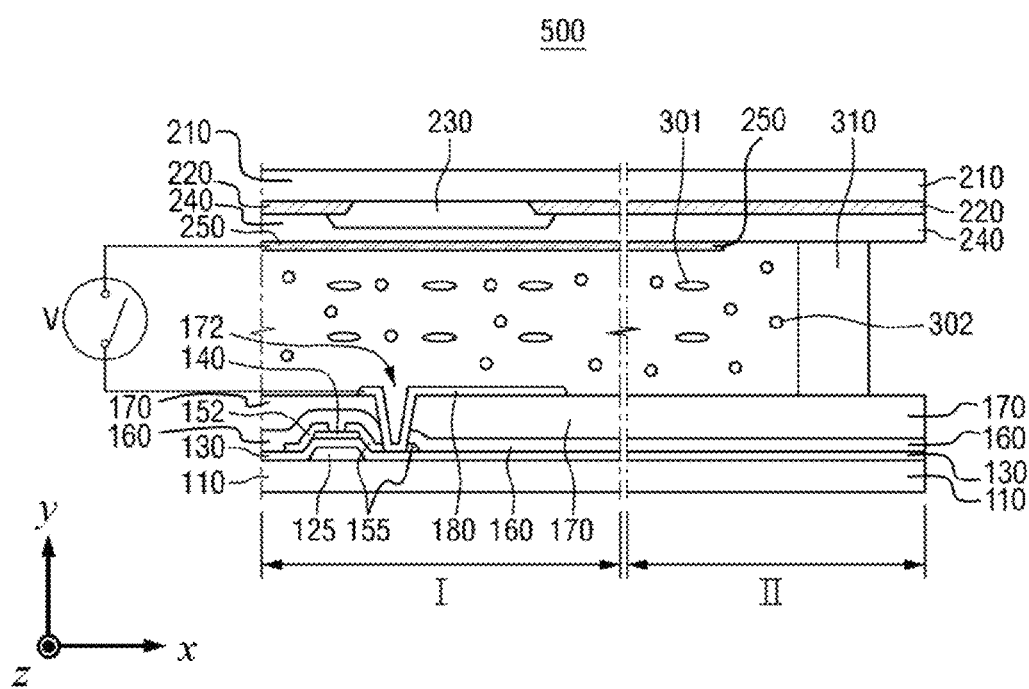

Referring to FIG. 3, with no electric field applied, a liquid crystal composition containing liquid crystal molecules 301 and photopolymerizable monomer compound 302 for forming liquid crystal alignment films is injected into the cell gap, to form the liquid crystal layer 300. In doing so, the sealing member 310 can prevent the liquid crystal molecules 310 and the photopolymerizable monomer composition 302 from leaking out of the cell gap.

On the other hand, the liquid crystal composition may be dropped onto the first display substrate 100 and the second display substrate 200 in vacuum to form the liquid crystal layer 300, and then the first display substrate 100 and the second display substrate 200 may be bonded together by way of placing the pixel electrode 180 of the first display substrate 100 and the common electrode 250 of the second display substrate 200 such that they face each other and then bonding them with the sealing member 310 made of a sealent or the like.

The liquid crystal molecules 301 are in a random planar state, since the surfaces of the first and second display substrates 100 and 200 have not been subjected to any alignment process.

The type of the liquid crystal molecules 310 is not specifically limited as long as it can be employed in LCD panels. In a non-limiting example, the liquid crystal molecules 301 may be of nematic liquid crystal having negative dielectric anisotropy.

The photopolymerizable monomer composition 302 includes photopolymerizable hydrocarbon derivative having perfluorocarbon group or a mixture thereof, and a mixture of photopolymerizable hydrocarbon derivative having perfluorocarbon group and hydrocarbon derivative having photopolymerization reactive group.

The hydrocarbon derivative having perfluorocarbon group includes photopolymerization reactive group. The perfluorocarbon group includes perfluoroalkyl group having 1 to 50 carbon atoms and perfluoroalkoxy group having 1 to 50 carbon atoms. The photopolymerization reactive group may be, but is not limited to, (meth)acryloyl group.

The photopolymerizable hydrocarbon derivative having perfluorocarbon group may be, but is not limited to, a compound represented by structural formulas below, or a mixture thereof.

<Formula 1>

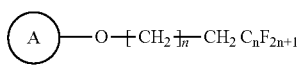

where a is 0 or 1, n is a natural number from 1 to 11, and A is photopolymerization reactive group.

<Formula 2>

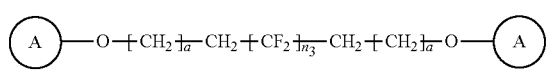

where a is 0 or 1, $n_3$ is a natural number from 1 to 10, and A is photopolymerization reactive group.

<Formula 3>

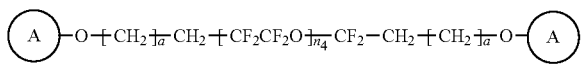

where a is zero or 1, $n_4$ is a natural number from 1 to 6, and A is photopolymerization reactive group.

<Formula 4>

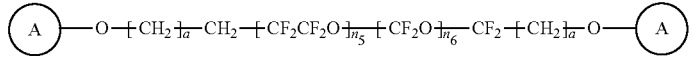

where a is 0 or 1, $n_5$ and $n_6$ are natural numbers from 1 to 6, respectively, and A is photopolymerization reactive group.

In a non-limiting example, a mixture of photopolymerizable hydrocarbon derivative having perfluorocarbon group may be a mixture of one or more of compounds represented by Formula 1 that has one photopolymerization reactive group, and one or more of compounds represented by Formula 2 to 4 that has two photopolymerization reactive groups. In this regard, the mixture may contain one of the compounds represented by Formula 1 and one of the compounds represented by Formulas 2 to 4 of at least 1 weight %, respectively, with respect to the total weight of the mixture.

The hydrocarbon derivative having polymerization reactive group may be, but is not limited to, a compound represented by Formula 5 below. The photopolymerization reactive group may be, but is not limited to, (meth)acryloyl group.

<Formula 5>

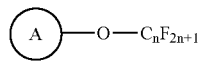

where n is a natural number from 6 to 26, and A is photopolymerization reactive group.

In Formula 5, it is advantageous to use a compound in which n is equal to or larger than 6 since the vertical alignment of the liquid crystal molecules 310 by the polymerization could not be effectively conducted if n is less than 6. Further, it is desired to use a compound in which n is equal to or larger than 10 since the vertical alignment of the liquid crystal molecules 301 is more thermally-stable as n is larger. Therefore, n may be a natural number, preferably, from 10 to 26.

In a non-limiting example, the mixture of photopolymerizable hydrocarbon derivative having perfluorocarbon group and hydrocarbon derivative having photopolymerization reactive group may be a mixture of one or more photopolymerizable hydrocarbon derivative having perfluorocarbon group selected from the compounds represented by Formulas 2 to 4 and hydrocarbon derivative having photopolymerization reactive group represented by Formula 5. The hydrocarbon derivative having photopolymerization reactive group may be added with the weight fraction of 10 part by weight to 70 part by weight with respect to the total weight of the photopolymerizable hydrocarbon derivative having perfluorocarbon group.

The liquid crystal composition may further include typical photo-initiator for inducing photopolymerization reaction of the photopolymerizable monomer compound 302.

If the content of the photopolymerizable monomer compound 302 contained in the liquid crystal composition is too low, the effects of vertical alignment of the liquid crystal molecules 301 and stabilization of orientation are insignificant. On the contrary, the content of the photopolymerizable monomer compound 302 is too high, bad orientation may be caused by high density and the performance of the LCD device may be deteriorated since it may be overly stabilized.

Accordingly, the weight fraction of the photopolymerizable monomer compound 302 with respect to the total weight of the liquid crystal composition may range from 0.05 wt % to 5 wt %, from 0.1 wt % to 3 wt %, or from 0.2 wt % to 2 wt %.

In some instances, a process for uniformizing the liquid crystal composition may optionally be carried out after injection of the liquid crystal composition, involving heating the LCD panel 500 at a temperature higher than the nematic-isotropic phase transition temperature of the liquid crystal molecules 301 and photopolymerizable monomer compound 302 by 0.1° C. to 20° C. and then cooling down it. In particular, the heating may be carried out at a heating rate of 5 to 10° C./min up to a temperature higher than an isotropic phase transition temperature of liquid crystals by 0.1° C. to 20° C. in 1 second to 5 minutes, and cooling was carried out at a rate of 5 to 10° C./min down to room temperature.

Figure 4:
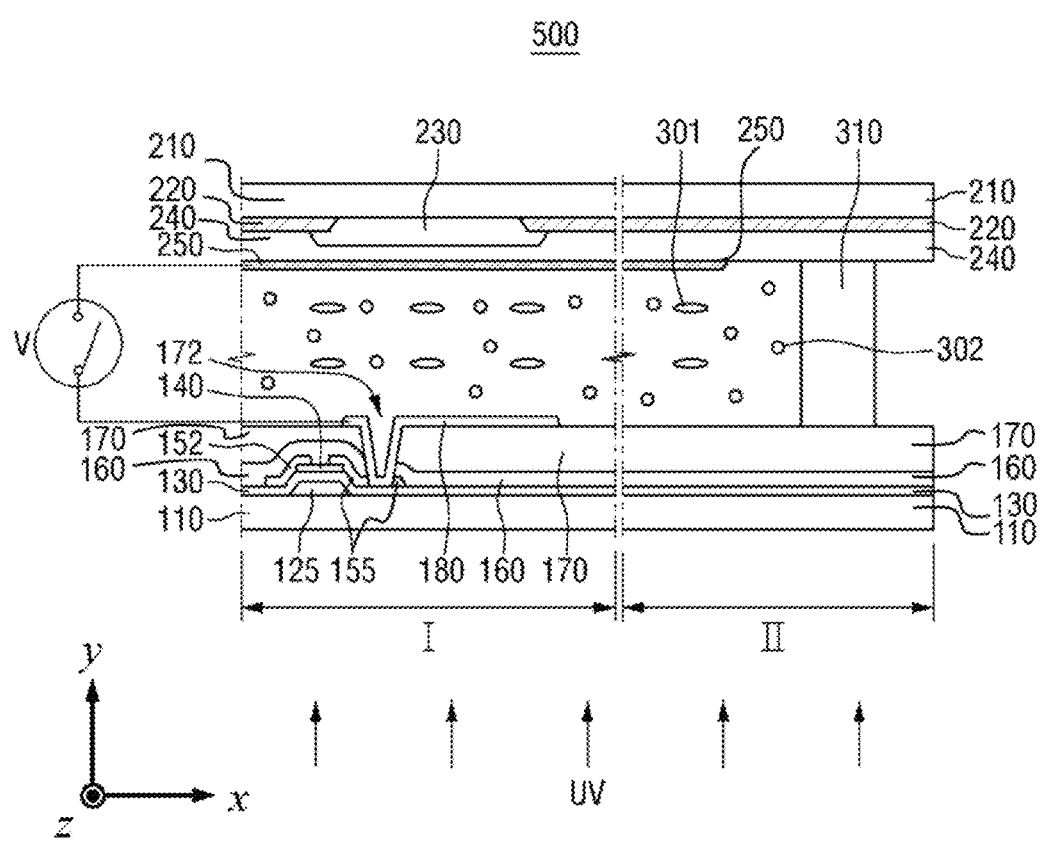

Referring to FIG. 4, the LCD panel 500 having the liquid crystal layer 300 formed between the first display substrate 100 and the second display substrate 200, with no electric field applied thereto, may be irradiated with UV ray, so that the liquid crystal molecules 301 are vertically aligned. Hereinafter, the UV irradiation is referred to as a first light irradiation.

The UV ray may have a wavelength to allow photopolymerization reaction to occur and may have, but is not limited to, a wavelength from 250 nm to 450 nm. The wavelength to allow photopolymerization reaction to occur may vary depending on the structure of the photopolymerizable monomer compound 302. The UV ray may be perpendicularly incident on the display substrates 100 and 200 and is may not be polarized.

The light intensity, irradiation time and temperature appropriate for inducing vertical alignment of the liquid crystal molecules 301 may vary depending on chemical structure and concentration of the photopolymerizable monomer compound 302, solubility for the liquid crystal molecules 301, and the number and reactivity of the photopolymerization reactive group.

For example, when the concentration of the photopolymerizable monomer compound 302 with respect to the total weigh of the liquid crystal composition is between 0.05 wt % and 5 wt %, the LCD panel may be irradiated with UV ray with intensity of several hundreds mW/cm$^2$ to several tens µW/cm$^2$ for 1 minute to 2 hours, thereby reducing vertical alignment of the liquid crystal molecules 301.

It is noted that the effective irradiation time given above is not limiting but may vary depending on the concentration of the photopolymerizable monomer compound 302 and the light intensity.

The UV irradiation may be carried out on a condition that the liquid crystal layer 300 disposed between the two display substrates 100 and 200 exhibits liquid crystal phase or isotropic phase, preferably on the condition that it exhibits the isotropic phase. Accordingly, it may be more efficient for inducing the vertical alignment of the liquid crystal molecules 301 to perform light irradiation while heating the liquid crystal layer 300.

Figure 5:
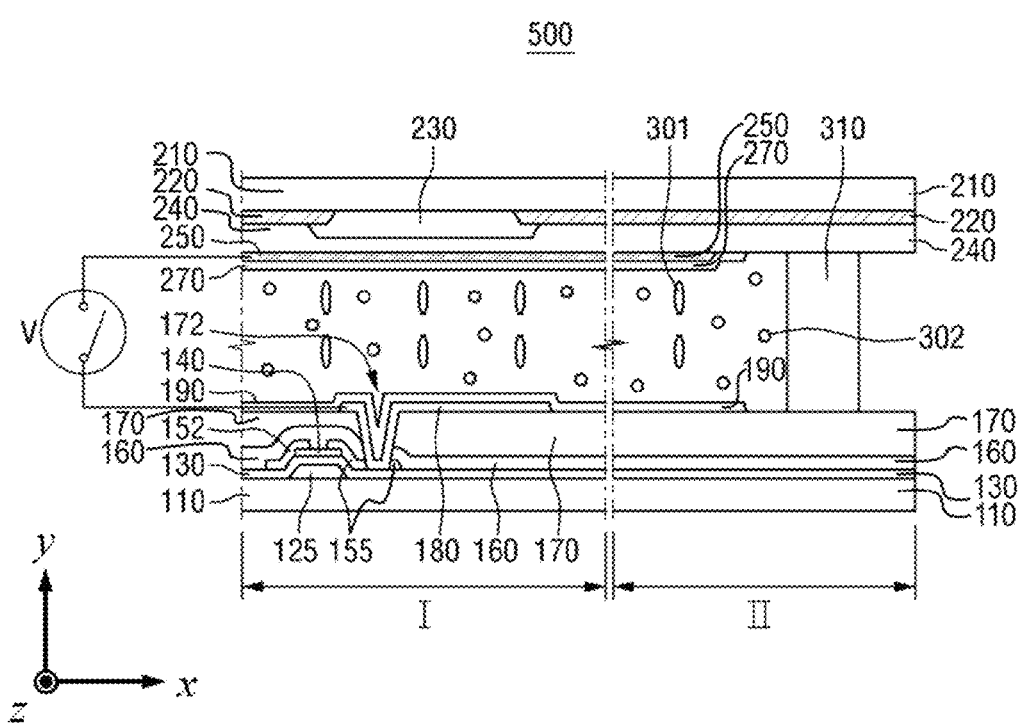

Referring to FIG. 5, as in FIG. 4, with no electric field applied, the liquid crystal layer 300 was irradiated with UV irradiation. As a result, the photopolymerizable monomer compound 302 is polymerized and is phase-separated from the liquid crystal molecules 301, and is concentrated on the surfaces of the respective display substrates 100 and 200, to form liquid-crystal vertical-alignment layers 190 and 270 as rigid solid thin-films. The concentration of the photopolymerizable monomer compound 302 in the liquid crystal composition is reduced by the first light irradiation.

The liquid crystal molecules 301 are aligned vertically to the display substrates 100 and 200, so that vertical orientation is achieved in which the average director and optical axis of the liquid crystal molecules 301 are aligned vertically to the display substrates 100 and 200.

The liquid crystal layer 300 subjected to the light irradiation was observed with a polarizing microscope. As a result, it could be seen that vertical alignment of the liquid crystal molecules 301 was induced uniformly to exhibit a dark state through the crossed polarizers. In addition, by using the conoscopy technique, it could be seen that the optical axis of the liquid crystal layer 300 is aligned vertically to the display substrates 100 and 200.

Then, electric field is applied to the vertically-aligned, liquid crystal layer 300, to evaluate electro-optical switching properties.

As described above, in the vertical orientation of the liquid crystal molecules 301 induced by the first light irradiation, the liquid crystal molecules 301 do not have a pretilt angle in a particular direction. When electric field perpendicular to the display substrates 100 and 200 is applied to the LCD panel 300 via the pixel electrode 180 and the common electrode 250, the liquid crystal molecules 301 rotate in the direction perpendicular to the electric field to thereby increase the transmittance. At this time, since the liquid crystal molecules 301 do not have a pretilt angle in a particular direction, the rotation directions of the liquid crystal molecules 301 differ from location to location in the liquid crystal layer 300. Consequently, defects in the orientation of the liquid crystal molecules 301 occur, causing the properties of the LCD panel 500 to deteriorate.

Figure 6:
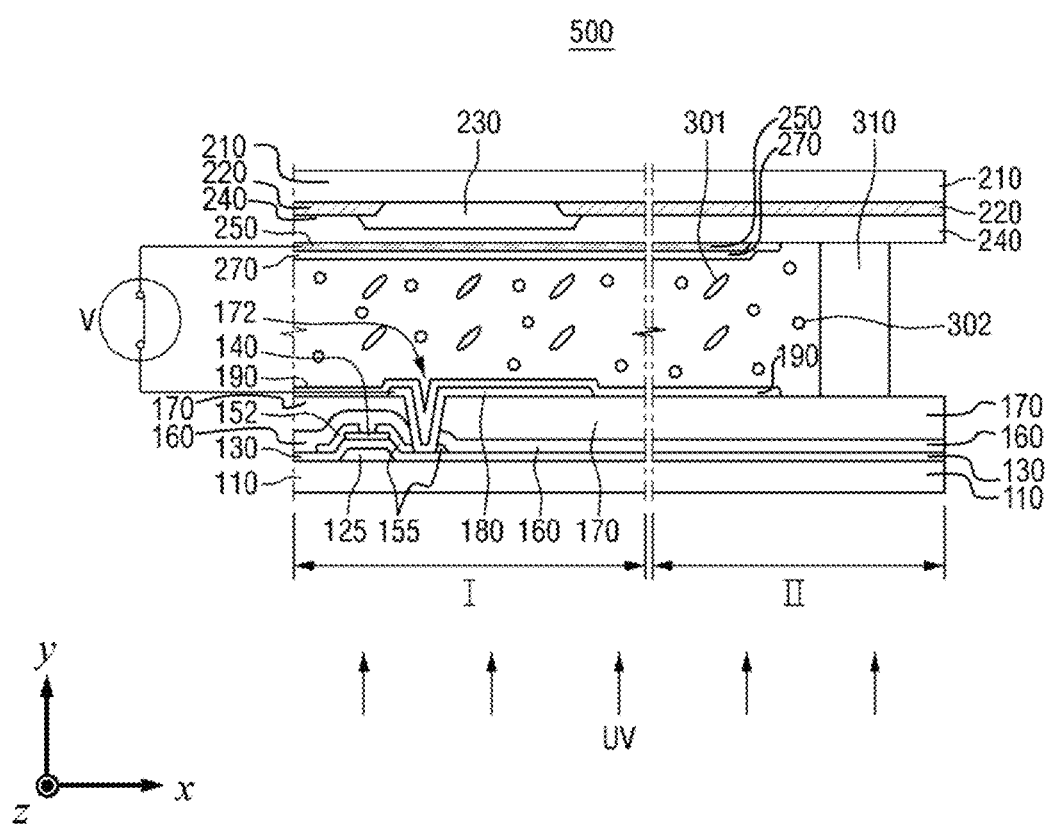

Referring to FIG. 6, with electric field applied, the liquid crystal layer 300 is irradiated with UV ray to induce the liquid crystal molecules 301 to have a particular pretilt angle. Hereinafter, this UV irradiation is referred to as a second light irradiation.

The process of applying electric field may be carried out under the condition that a DC or AC electric field is applied such that the light transmittance of the LCD panel 500 is 5% (T05) to 100% (T100) of the maximum transmittance through the crossed polarizers.

By applying electric field under the above condition, a particular optical state is induced for the liquid crystal molecules 301 in the liquid crystal display panel 500, and the photopolymerizable monomer compound 302 chemically reacts additionally, thereby achieving surface stabilization of the pretilt angle of the liquid crystal molecules 301.

At this time, the UV ray used may have a wavelength, preferably, ranging from 300 nm to 400 nm. It is preferable to irradiate with the UV ray with intensity from 200 mW/cm$^2$ to 50 µW/cm$^2$ for 1 minute to 60 minutes, in that the light stabilization efficiency of the photopolymerization reactive group of the photopolymerizable monomer compound 302 is maximized to achieve the surface stabilization of the orientation of the liquid crystal molecules 301.

It is preferable to apply electric field and wait until after defects are minimized, and then to perform the process of UV irradiation after the orientation of the liquid crystal molecules 301 is stabilized. Further, the process of UV irradiation may be carried out as two or more sub-steps with different intensities of electric field or UV ray.

The ranges of UV rays used in the first light irradiation and the second light irradiation may be individually selected so that they may or may not overlap each other depending on the photopolymerization reactive group of the photopolymerizable monomer compound 302 used.

It is preferable to carry out the second UV irradiation on a condition that the liquid crystal layer 300 disposed between the two display substrates 100 and 200 exhibits a liquid crystal phase. Since the light irradiation can be carried out while the orientation of the liquid crystal molecules 301 is controlled in a particular state with the applied voltage, it is more efficient to stabilize orientation than in the isotropic phase.

Figure 7:
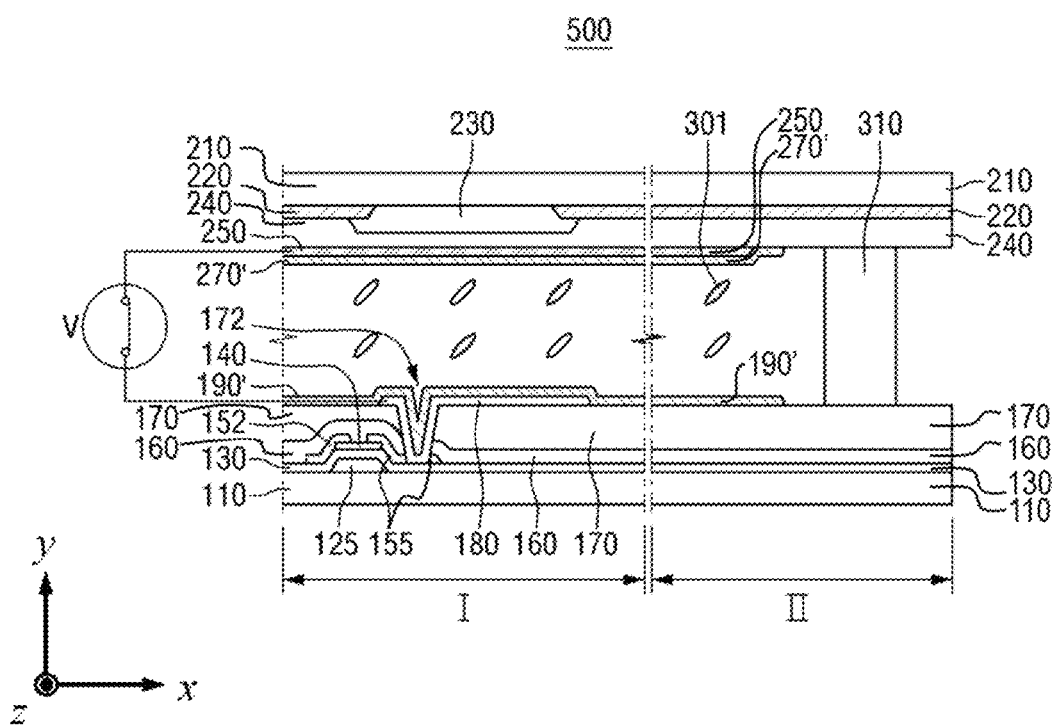

Referring to FIG. 7, by virtue of the second light irradiation, the photopolymerizable monomer compound 302 in the liquid crystal layer 300 forms polymer, and the liquid-crystal vertical-alignment layers 190 and 270 are modified as alignment stabilization layers 190' and 270' for making a pretilt angle of the liquid crystal molecules 301. At this time, the liquid crystal molecules 301 are inclined with respect to the display substrates 100 and 200 by the electric field applied. In some instances, the liquid crystal molecules 301 may be parallel to the display substrates 100 and 200 by the electric field applied.

Figure 8:
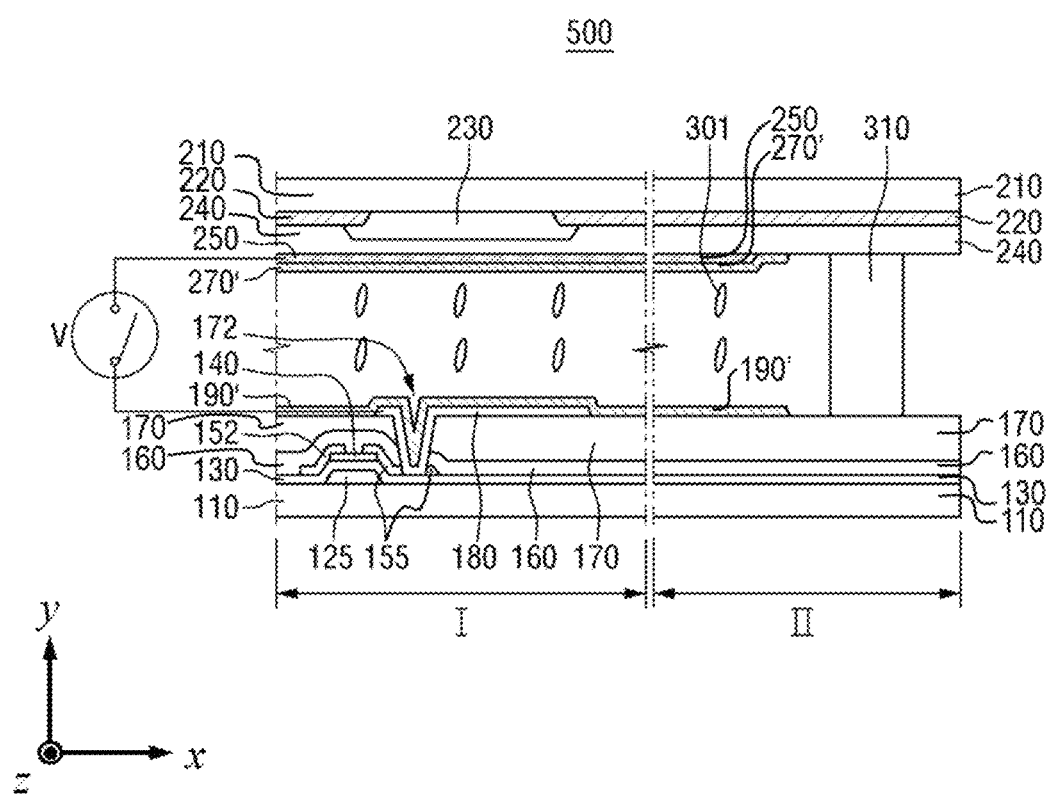

Referring to FIG. 8, the electric field is removed after the alignment stabilization layers 190' and 270' are formed, and the liquid crystal molecules 301 transition to a vertical orientation state memorizing the pretilt direction.

Thus far, the two-step light irradiation has been described, in which the first light irradiation is carried out with no electric field applied so as to induce the vertical alignment of the liquid crystal molecules 301 and then the second irradiation is carried out with electric field applied so as to stabilize the pretilt angle of the liquid crystal molecules 301. However, it is also possible to induce the vertical alignment of the liquid crystal molecules 301 and stabilize the pretilt angle of the liquid crystal molecules 301 by carrying out light irradiation once, with electric field applied from the beginning, instead of two-step irradiation.

More detailed description on this will be made below with reference to FIGS. 9 to 12.

Figure 9:
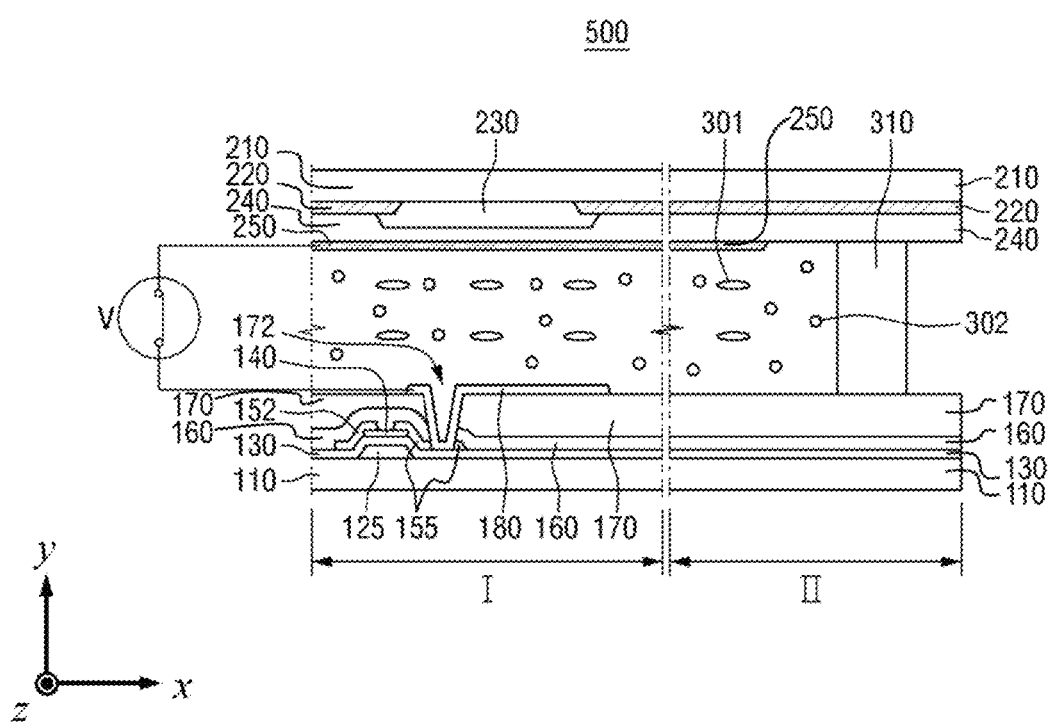
FIGS. 9 to 12 are cross-sectional views for schematically illustrating a series of processes of a method for manufacturing the LCD panel shown in FIG. 1, according to another exemplary embodiment of the present disclosure.

Referring to FIG. 9, even when electric field is applied after the liquid crystal layer 300 is formed between the two display substrates 100 and 200, the liquid crystal molecules 301 do not react with the electric field applied due to the negative dielectric anisotropy of the liquid crystal molecules 301. Thus, the liquid crystal molecules 301 are arranged parallel to the surfaces of the two display substrates 100 and 200, i.e., in a random planar state like in FIG. 3.

Figure 10:
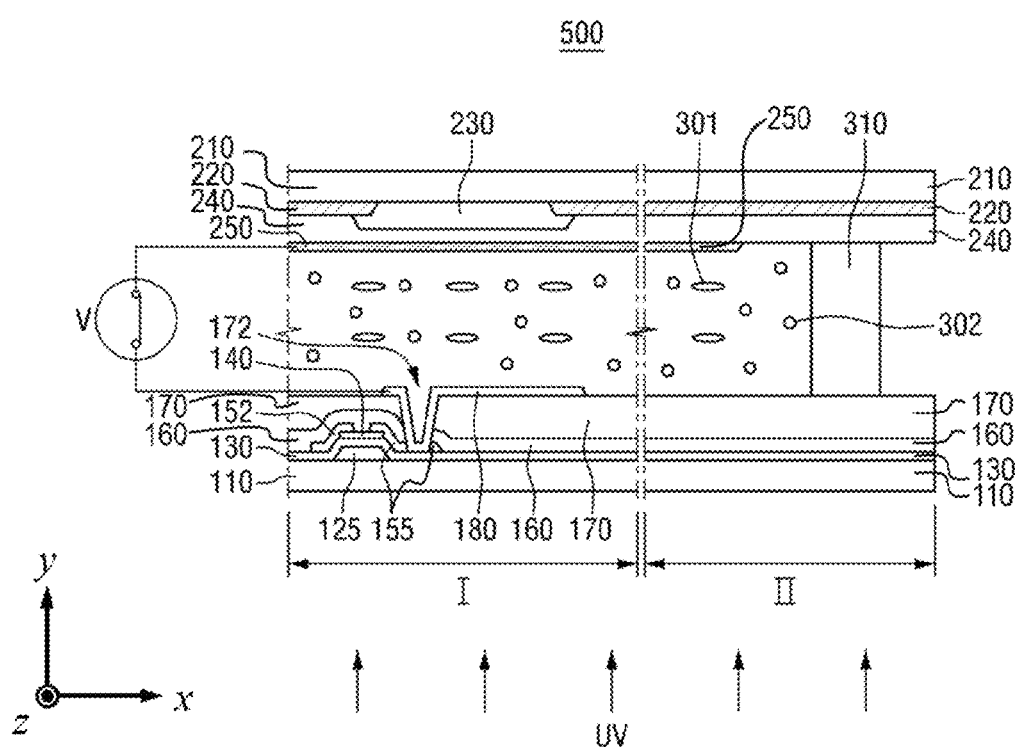
Figure 11:
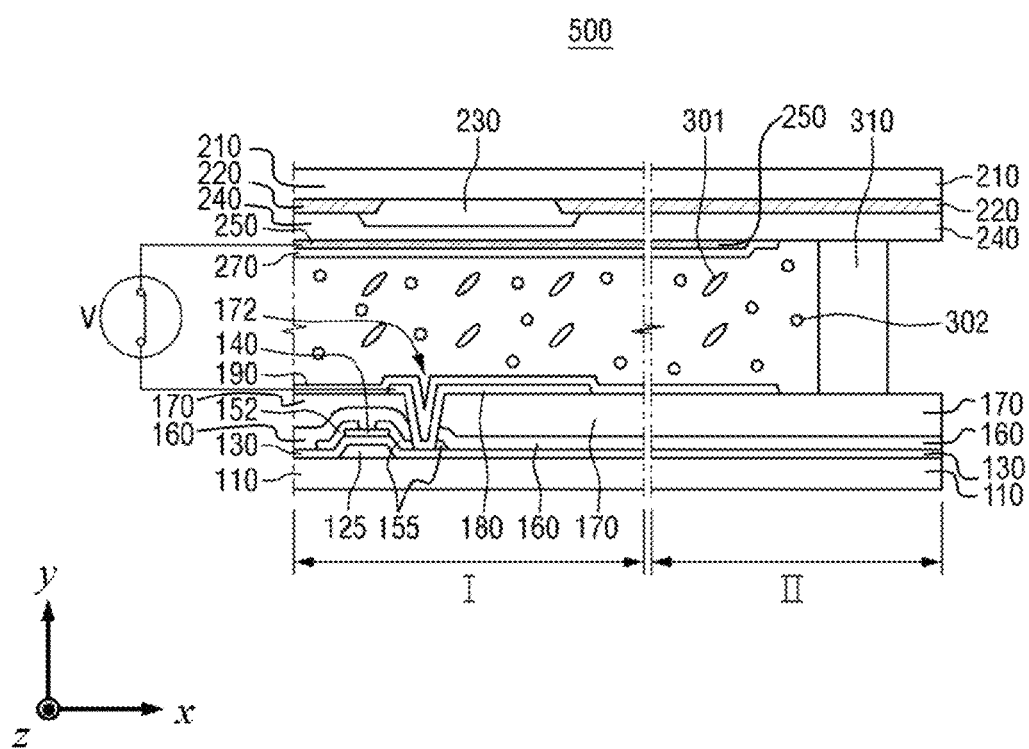

Referring to FIGS. 10 and 11, when the LCD panel 500 is irradiated with UV ray with electric field applied, photopolymer created from the photopolymerizable monomer compound 302 forms liquid-crystal vertical-alignment films 190 and 270 for inducing vertical alignment of the liquid crystal molecules 301 on the surfaces of the pixel electrode 180 and the common electrode 250. The liquid crystal molecules 301 have the arrangement inclined toward a particular direction in response to electric field applied.

The inclination degree of the liquid crystal molecules 301 depends on the level of the voltage applied. Depending on the state of the liquid crystal molecules 301 to be stabilized, a voltage may be applied that has the level corresponding to the transmittance between 5% and 100% through the crossed polarizers.

Accordingly, it is possible to carry out the process with two or more voltages or light intensities while varying intensity of electric field applied or light for irradiation, during the process of light irradiation.

Figure 12:
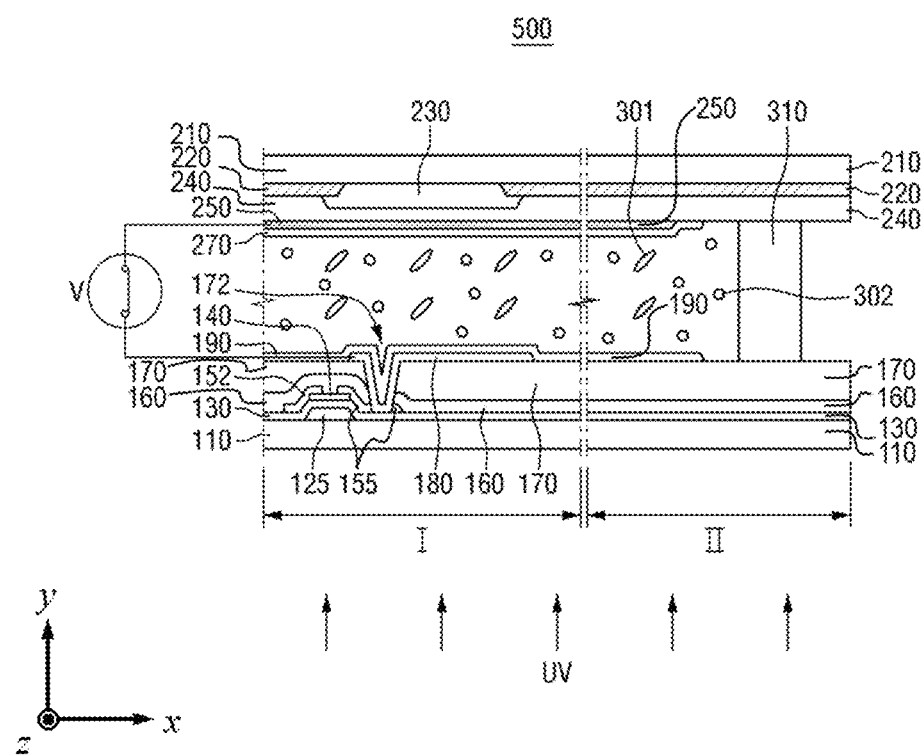

FIG. 12 show a process in which light irradiation is carried out continuously onto the LCD panel 500.

The light irradiation may be carried out at a temperature within the range of the nematic phase temperature of the liquid crystal composition. After the light irradiation, an additional process of heating the produced liquid crystal layer 300 above the isotropic transition temperature and then cooling it down may be carried out. Such light irradiation method has been described above with reference to FIGS. 2 to 8.

Forming the alignment stabilization layers 190' and 270' and vertically aligning the pretilted liquid crystal molecules 301 are the same as described above with respect to FIGS. 7 and 8.

Although not shown in FIGS. 2 to 12, if the pixel electrode 180 and/or the common electrode 250 are microslit-patterned in every pixel, the pretilt angle of the liquid crystal molecules 301 in multiple domains can be stabilized in every pixel.

When the LCD panel 500 is manufactured according to the method of inducing and stabilizing orientation of liquid crystals by photopolymerization chemical reaction of photopolymerizable monomer composition 302, viewing angle, brightness and contrast ratio of the LCD panel 500 can be improved and the switching speed of liquid crystal molecules can be faster.

Since the method is carried out at room temperature or at around the isotropic phase temperature of the liquid crystal molecules 301, the process temperature is low and the processes is simple, so that the method can replace traditional alignment film coating process and firing process carried out at high temperature. Accordingly, in addition to high definition LCD devices employing glass substrates, the method is useful in manufacturing display devices vulnerable to high-temperature processes, such as flexible LCD display panel, since the method does not involve the alignment film firing process carried out at high-temperature.

The LCD panel manufactured according to the method of the present disclosure may be applicable to a variety of electro-optical devices using liquid crystal molecules, such as TVs, 3D-TV, monitors, tablet PCs, various types of mobile devices, and particularly flat panel displays.

[First Embodiment]

An LCD panel was manufactured using, as first and second display substrates, display substrates on which unpatterned, transparent electrodes (ITO) are formed, according to the method described above with reference to FIGS. 2 to 8.

Unpatterned, transparent electrodes (ITO) were formed on the first and second display substrates, respectively. Subsequently, ultrasonic cleaning is performed on them in distilled water using a cleaning agent, then they were cleaned using acetone and isopropyl alcohol, respectively, and were dried.

The first display substrate and the second display substrate were assembled such that the transparent electrodes thereon face each other, without any alignment process. A composition for forming a liquid crystal layer was produced with the weight fraction of 99.0 wt % of liquid crystal molecules having negative dielectric anisotropy, and 1.0 wt % of a mixture of photopolymerizable monomer compound and photo-initiator having 2.0 wt % with respect to the photopolymerizable monomer compound, the photopolymerizable monomer compound is produced by mixing 50 wt % of a compound represented by Formula 1-1 below, and 50 wt % of a compound represented by Formula 2, where $n_2$ is 7. The LCD panel assembly was manufactured by injecting the composition for forming a liquid crystal layer thereinto. In Formulas 1-1 and 2 below, A-group denotes photopolymerizable acryloyl group.

<Formula 1>

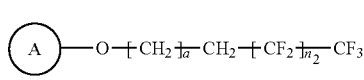

where a is 1, and $n_2$ is 3, 5, 7 or 9.

<Formula 2>

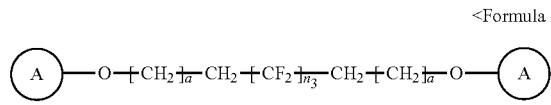

where a is 0, and $n_3$ is 4.

In making an LCD panel assembly, the distance between the first display substrate and the second display substrate was maintained to be 10 μm. The process of injecting the composition for forming a liquid crystal layer was carried out at 95° C., which is the isotropic-phase temperature of the composition.

After the injection of the composition, the LCD panel assembly was cooled down at room temperature, and the orientation of the liquid crystal molecules was observed with a polarizing microscope.

Figure 13:
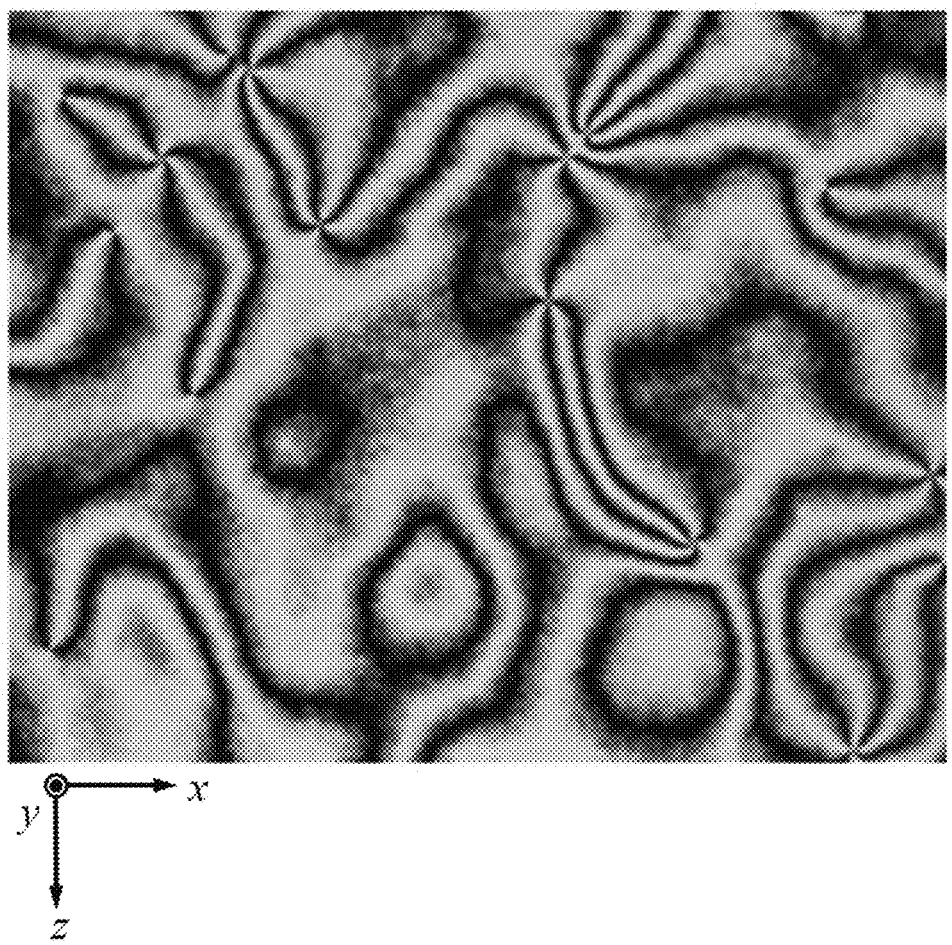
FIGS. 13 to 15 are photographs of an LCD panel manufactured according to a first embodiment observed with a polarizing microscope through crossed polarizers.

As a result, it was observed that the liquid crystal molecules in the liquid crystal layer were randomly arranged in the horizontal direction with respect to the display substrates, due to the surfaces not subjected to any alignment process, as shown in FIG. 13.

Subsequently, the LCD panel assembly was heated at 92° C., which is the isotropic-phase temperature of the composition for forming a liquid crystal layer. Then, with no electric field applied to the LCD panel assembly, it was irradiated with ultraviolet (UV) ray (wavelength of 365 nm, the intensity of 2 mW/cm$^2$) for 10 minutes, so that the photopolymerizable monomer compound, which was mixed with the liquid crystal molecules at the time of forming the liquid crystal layer, reacts with the UV ray, inducing vertical alignment of the liquid crystal molecules.

Figure 14:
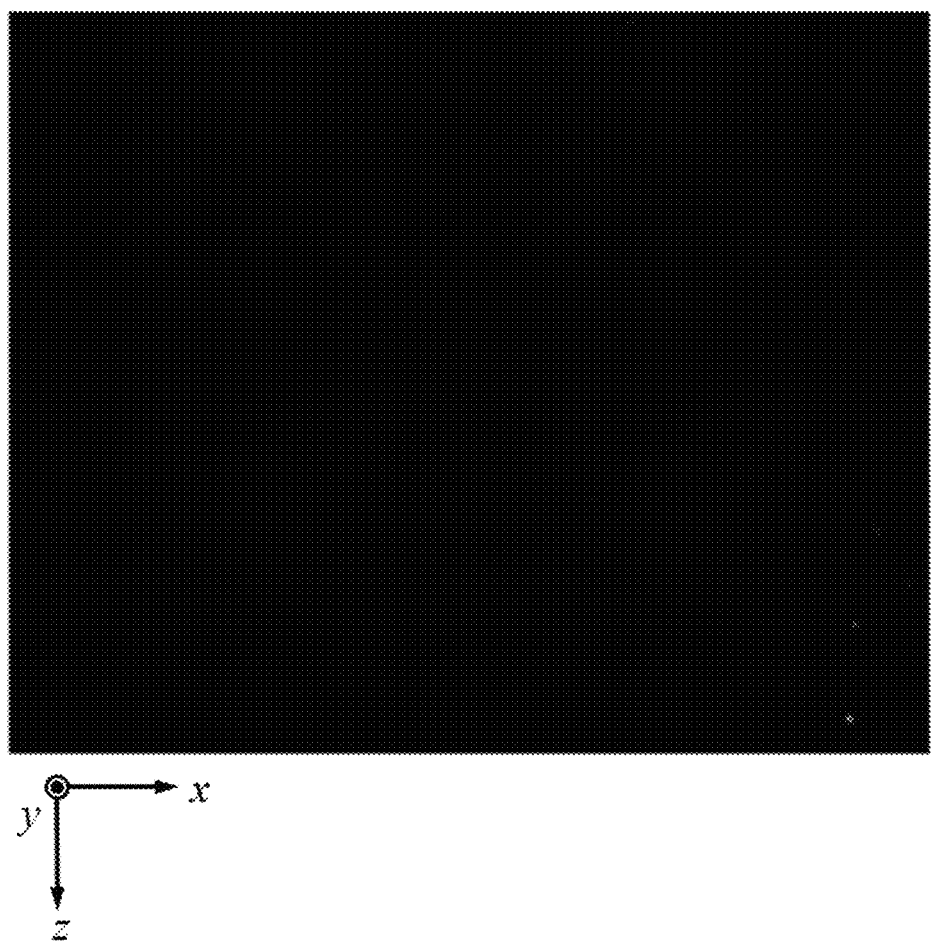
Figure 15:
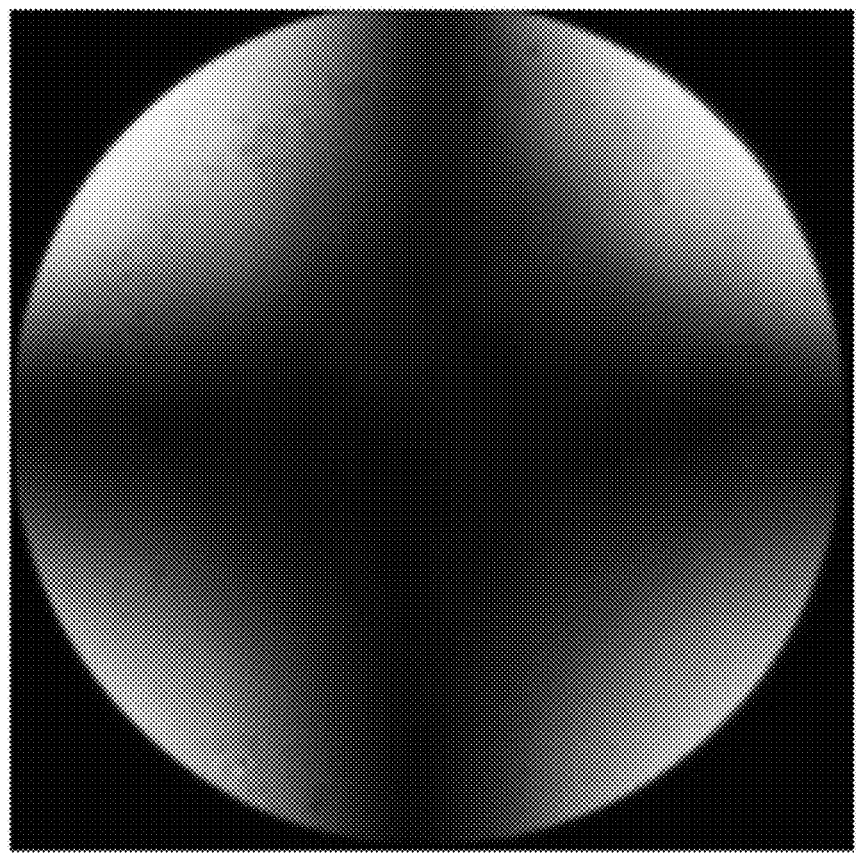

The LCD panel thus manufactured was observed with a polarizing microscope at room temperature, and the result can be seen from FIG. 14. In addition, the orientation of the liquid crystal molecules was observed using a conoscopy image, and the result can be seen from FIG. 15.

As can be seen from FIG. 14, in the manufactured LCD panel, the liquid crystal layer exhibited a completely dark state through the crossed polarizers. Further, as can be seen from the conoscopy image shown in FIG. 15, the liquid crystal molecules were aligned vertically with respect to the surfaces of the substrates.

Figure 17:
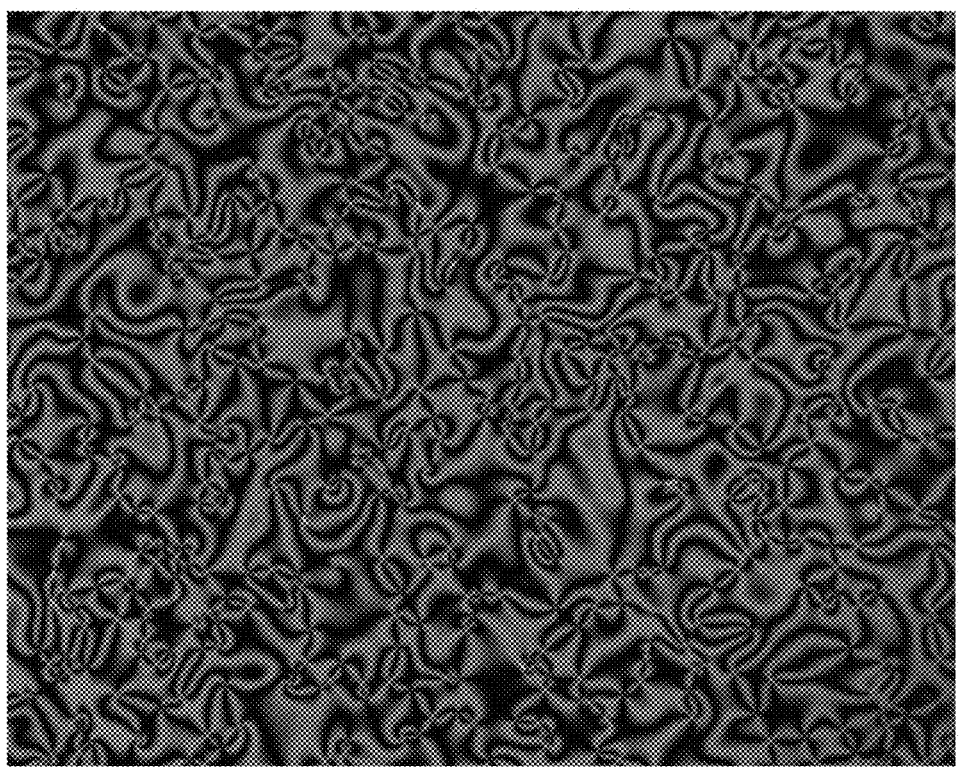
Figure 17:
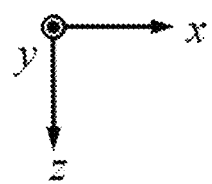
Figure 18:
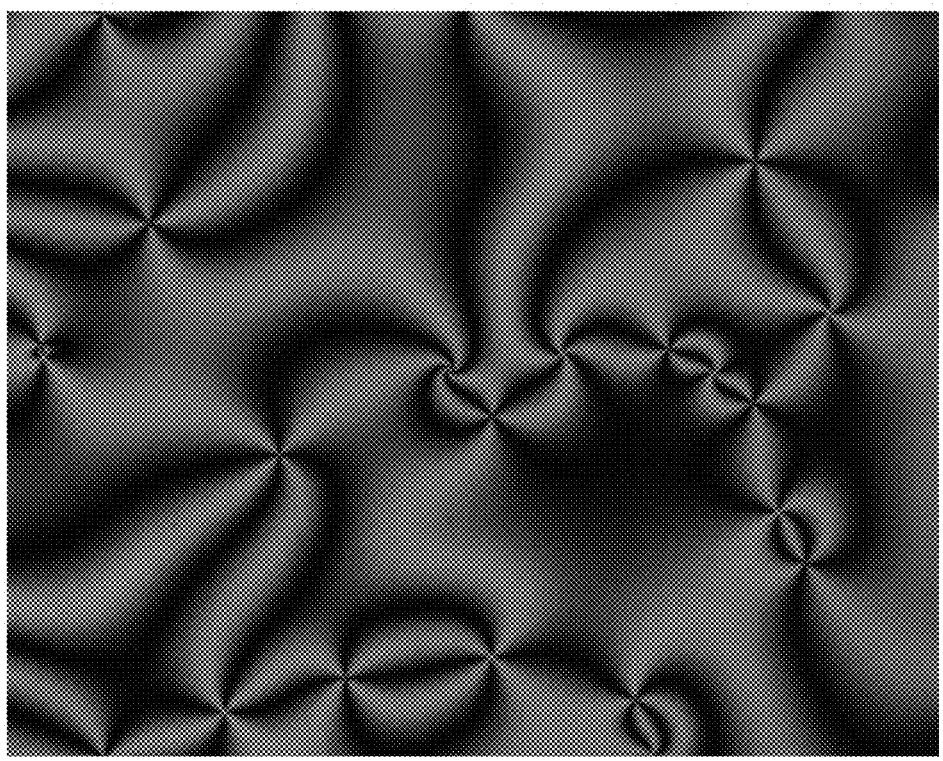

During the processes of manufacturing the LCD panel illustrated in FIGS. 2 to 8, electric field corresponding to the voltage level of 5 V was applied to the LCD panel assembly in which liquid crystal molecules are vertically aligned with the first light irradiation, and the orientation of the liquid crystal molecules was observed. The results before and after applying the electric field are shown in FIGS. 16 to 18, respectively.

Figure 16:
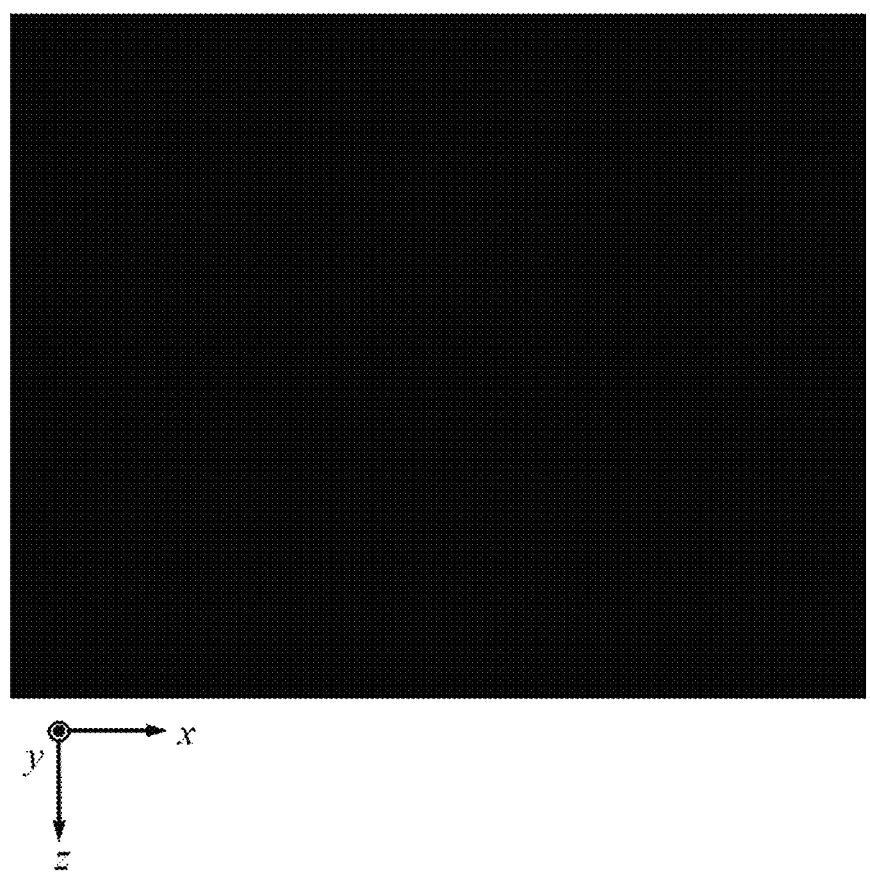
FIGS. 16 to 18 are photographs of an LCD panel manufactured according to a first embodiment after the first irradiation, observed with a polarizing microscope through crossed polarizers, showing switching upon application of electric field.

Typically, a liquid crystal layer having liquid crystal molecules vertically aligned with respect to display substrates exhibits a dark state through crossed polarizers as shown in FIG. 16. When an electric field is applied thereto, the liquid crystal molecules rotate in the direction perpendicular to the electric field and, accordingly, transmittance is increased as is evidenced by FIG. 16. If the liquid crystal molecules are not pretilted toward a particular direction, however, the liquid crystals rotate in random directions in the liquid crystal cell. Accordingly, a number of defects occur in orientation of the liquid crystals as shown in FIG. 17, deteriorating characteristics of the LCD device. However, the defects shown in FIG. 17 disappear slowly with time, and a transition is made to a bright state with fewer defects as shown in FIG. 18.

Subsequently, an AC electric field of T80 (transmittance of 80% relative to the maximum transmittance) was applied across the first and second display substrates of the LCD panel thus manufactured at room temperature, to see that defects were minimized and the orientation of the liquid crystal molecules was stabilized. Then, the LCD panel with electric field applied thereto was irradiated with UV ray (the wavelength of 365 nm, the intensity of 20 mW/cm$^2$) for 30 minutes, so that, among photopolymerizable monomer compounds mixed with the liquid crystal molecules at the time of forming the liquid crystal layer, those not photo-polymerized with the first light irradiation are photo-polymerized, thereby inducing a pretilt angle of the liquid crystal molecules and stabilizing the surfaces to manufacture the LCD panel.

The LCD panel thus manufactured was observed with a polarizing microscope, and it was seen that the liquid crystal layer, with no electric field applied thereto, exhibited a complete dark state through the crossed polarizers, like before the second light irradiation.

In addition, observation was made on the final LCD panel manufactured by applying electric field to and performing the second light irradiation on the LCD panel assembly manufactured according to the first embodiment, to see if defects in the liquid crystal molecules occur at the time of switching on/off the device. The results can be seen from FIGS. 19 and 20.

Figure 19:
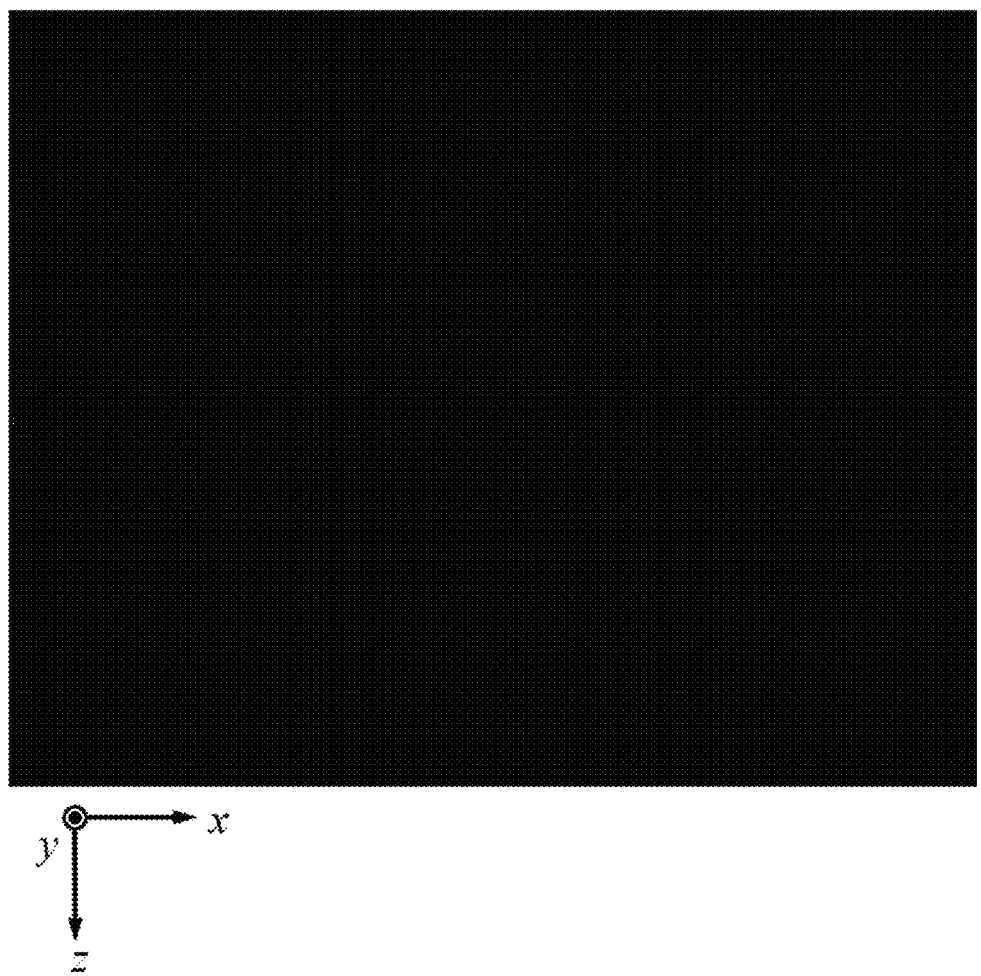
FIGS. 19 and 20 are photographs of an LCD panel manufactured according to a first embodiment after the second irradiation, observed with a polarizing microscope through crossed polarizers, showing switching upon application of electric field.
Figure 20:
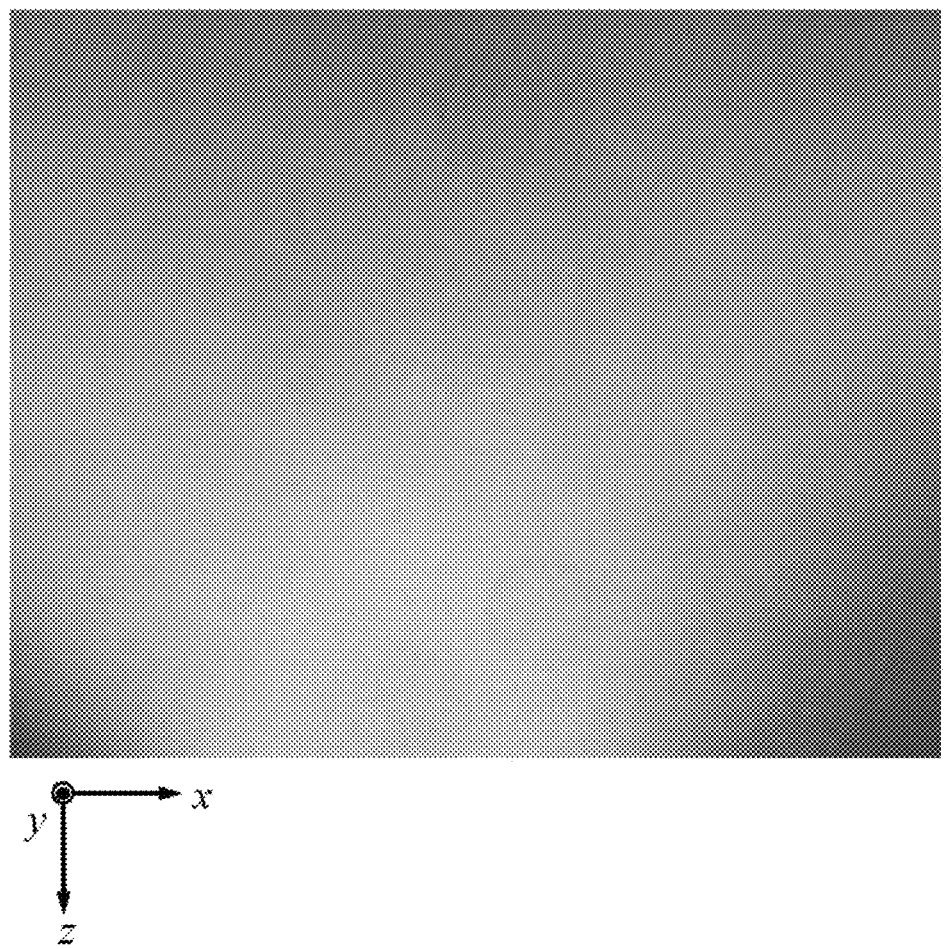

Upon applying electric field corresponding to the voltage level of 5 V again in a dark or black state as shown in FIG. 19, it was observed that the liquid crystal molecules reacted with the electric field to change the orientation. Accordingly, the optical axis of the liquid crystal molecules made the angle of 45 degree with the transmission axes of the polarizers on the surfaces of the respective display substrates, so that the transition to a bright state was made as shown in FIG. 20 without causing defects of the liquid crystal molecules.

This is resulted from a series of processes that the photopolymerizable monomer compound in the liquid crystal composition forms some photopolymer by the first light irradiation to thereby induce vertical alignment on the surfaces of the display substrates, and the polymer created from the residual photopolymerizable monomer compound, which has not reacted, form the alignment stabilization layer during the second light irradiation to thereby stabilize the pretilt angle of the liquid crystal molecules induced by electric field.

The same experiment as that in the first embodiment was carried out using a photopolymerizable monomer compound represented by Formula 1-1 with a different value for $n_2$, a result of which is shown in Table 1:

TABLE 1

| $n_2$ value | Initial Orientation Before Light Irradiation | LC Molecules Orientation After Irradiation | Pretilt Stabilization |
|---|---|---|---|
| 3 | Horizontal | Vertical | Yes |
| 5 | Horizontal | Vertical | Yes |
| 7 | Horizontal | Vertical | Yes |
| 9 | Horizontal | Vertical | Yes |

As can be seen from Table 1, the initial, random planar state is transitioned to a vertical orientation as the photopolymerizable monomer compounds are polymerized by light irradiation, and the pretilt angle is stabilized in a particular direction, so that the response time of the LCD panel becomes faster and the brightness and contrast ratio of the device are improved.

[Second Embodiment]

The substrates were manufactured and bonded to each other and the liquid crystal composition was injected in the same method as that in the first embodiment, except for that the liquid crystal composition was produced using 0.7 wt % of a compound represented by Formula 2 as the photopolymerizable monomer compound, where $n_3$ is 6, and 99.3 wt % of liquid crystal molecules having negative dielectric anisotropy. The photo-initiator was mixed with the photopolymerizable monomer compound with the same weight fraction. In Formula 2, A-group denotes photopolymerizable acryloyl group.

<Formula 2>

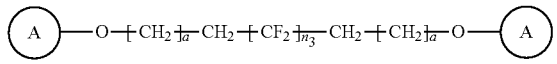

where a is 0, and $n_3$ is 2, 4, 6 or 8.

After the injection of the composition, the LCD panel assembly was cooled down at room temperature, and the orientation of the liquid crystal molecules was observed with a polarizing microscope. As a result, like in the first embodiment, it was observed that the liquid crystal molecules in the liquid crystal molecule cells were randomly arranged in the horizontal direction with respect to the substrates, due to the surfaces not subjected to any alignment process.

Subsequently, electric field was applied to the LCD panel assembly, and it was seen that the liquid crystal molecules do not react with the electric field applied due to negative dielectric anisotropy of the liquid crystal molecules and thus they remain in the initial, random planar state.

The LCD panel, with electric field applied thereto, was irradiated with ultraviolet (UV) ray (wavelength of 365 nm, the intensity of 2 mW/cm$^2$) for 30 minutes, and then with UV ray (intensity of 20 mW/cm$^2$) for 30 minutes at room temperature, so that the photopolymerizable monomer compound, which was mixed with the liquid crystal molecules at the time of forming the liquid crystal layer, reacted with the UV ray, inducing vertical alignment of the liquid crystal molecules and stabilizing it.

Figure 21:
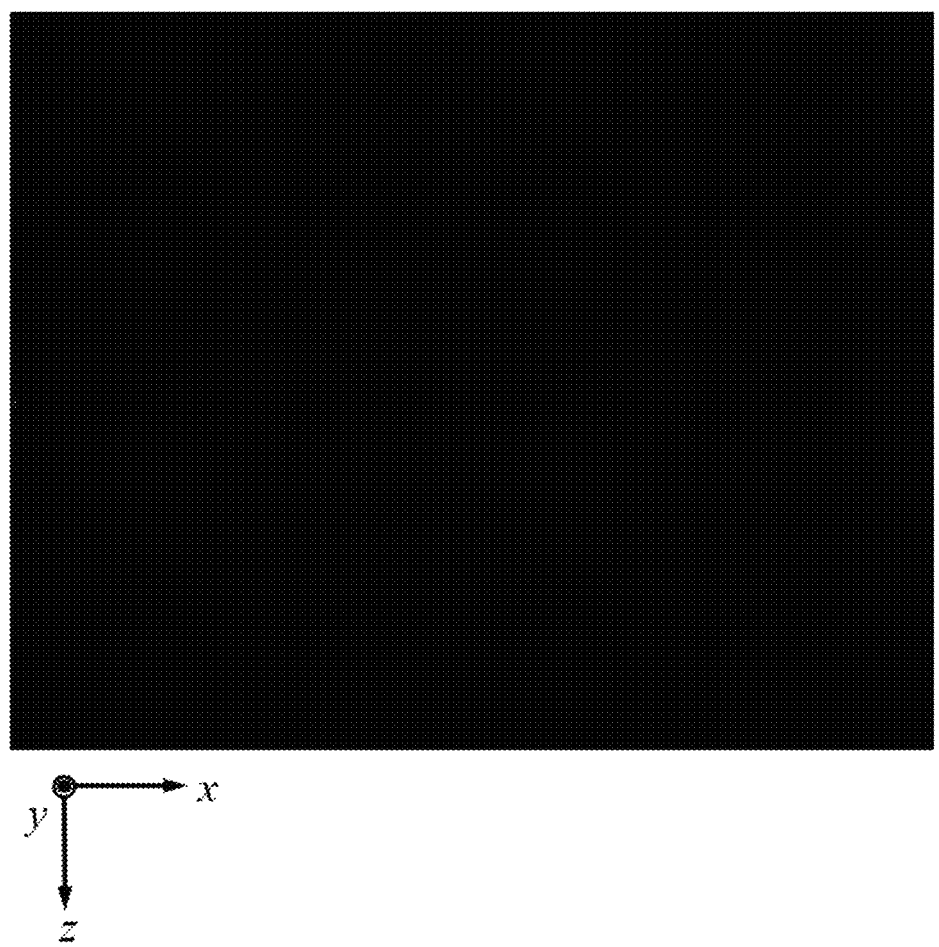
FIGS. 21 and 22 are photographs of an LCD panel manufactured according to a second embodiment after the light stabilization by UV irradiation, observed with a polarizing microscope through crossed polarizers, showing changes in transmittance before and after application of voltage, respectively.

After removing the electric field and heating the LCD panel up to 95° C. to cool it down, the LCD panel thus manufactured was observed with a polarizing microscope at room temperature, and the result can be seen from FIG. 21. As can be seen from FIG. 21, in the LCD panel thus manufactured, the liquid crystal layer exhibited a completely dark state through the crossed polarizers, and the liquid crystal molecules were aligned vertically with respect to the surfaces of the substrates.

Figure 22:
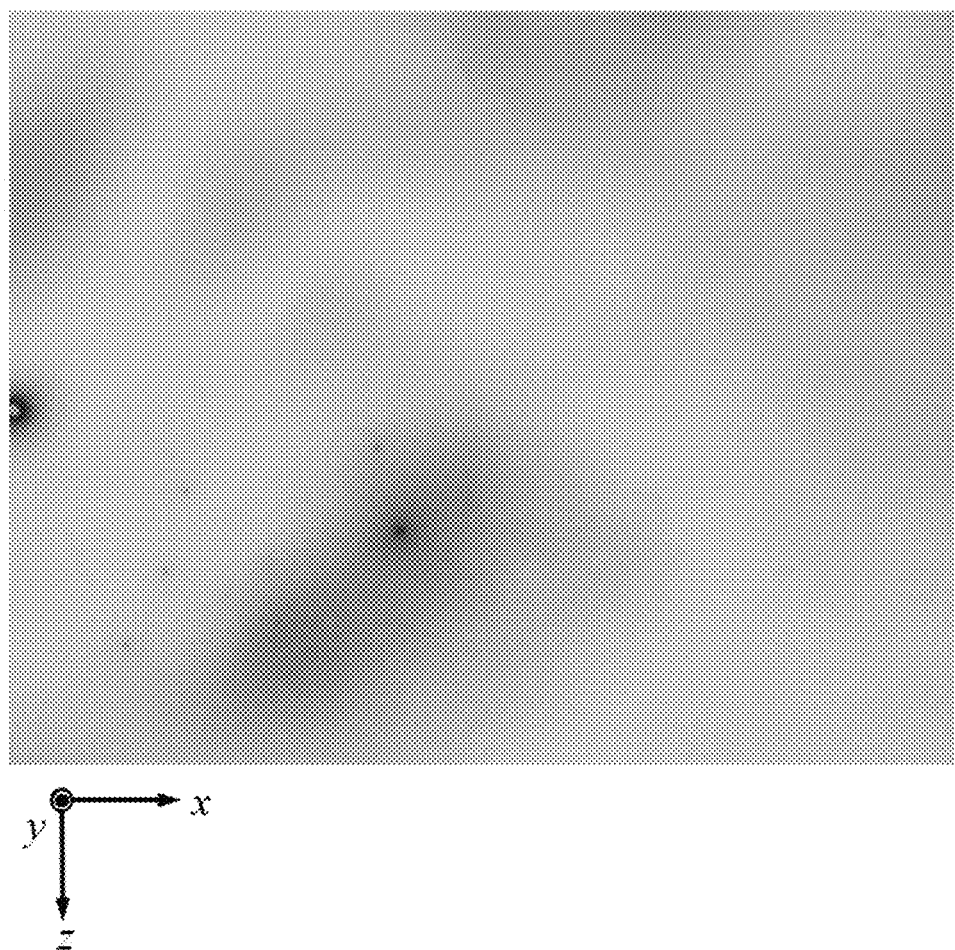

Electric field corresponding to the voltage level of 4 V was applied to the LCD panel and it was observed whether defects occur in the liquid crystal molecules at the time of switching on/off the device. The results before and after applying electric field are shown in FIGS. 21 and 22, respectively.

Upon applying electric field corresponding to the voltage level of 4V in an initial dark state as shown in FIG. 21, it was observed that the liquid crystal molecules reacted with the electric field to change the orientation. Accordingly, the optical axis of the liquid crystal molecules made the angle of 45 degree with the transmission axes of the polarizers on the surfaces of the respective display substrates, so that that the transition to a bright state was made as shown in FIG. 22 without causing defects of the liquid crystal molecules.

This is resulted from a series of processes that the photopolymerizable monomer compound in the liquid crystal composition forms some photopolymer by the initial light irradiation to thereby induce vertical alignment on the surfaces of the display substrates, so that the liquid crystal molecules react with the electric filed to be inclined, and the polymer created from the residual photopolymerizable monomer compound, which has not reacted, form the alignment stabilization layer during the continued light irradiation to thereby stabilize the pretilt angle of the liquid crystal molecules induced by electric field.

The same experiment as that in the second embodiment was carried out using a photopolymerizable monomer compound represented by Formula 2 with a different value for $n_3$, a result of which is shown in Table 2:

TABLE 2

| $n_3$ value | Initial Orientation Before Irradiation | Liquid Crystal Orientation After Irradiation | Pretilt Stabilization |
|---|---|---|---|
| 2 | Horizontal | Vertical | Yes |
| 4 | Horizontal | Vertical | Yes |
| 6 | Horizontal | Vertical | Yes |
| 8 | Horizontal | Vertical | Yes |

As can be seen from Table 2, the initial, random planar state is transitioned to a vertical orientation as the photopolymerizable monomer compounds are photo-polymerized by light irradiation, and the pretilt angle is stabilized in a particular direction, so that the response time of the LCD panel becomes faster and the brightness and contrast ratio of the device are improved.

[Third Embodiment]

The LCD panel was manufacture according to the same method as in the first embodiment and evaluated the orientation of the liquid crystal molecules and switching characteristics of the device, except for that the LCD panel assembly was manufactured by injecting a composition for forming a liquid crystal layer thereinto, the composition for forming a liquid crystal layer being produced with the weight fraction of 99.0 wt % of liquid crystal molecules having negative dielectric anisotropy, and 1.0 wt % of a mixture of photopolymerizable monomer compound and photo-initiator having 2.0 wt % with respect to the photopolymerizable monomer compound, the photopolymerizable monomer compound being produced by mixing 50 wt % of a compound represented by Formula 1-1, and 50 wt % of a compound represented by Formula 3, where n is 7. In Formulas 1-1 and 3 below, A-group denotes photopolymerizable methacryl group or acryl group, respectively.

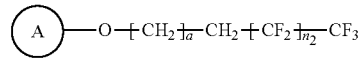

<Formula 1-1> where a is 1, and $n_2$ is 3, 5, 7 or 9.

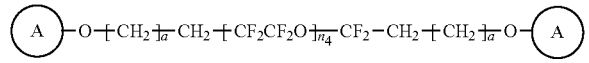

<Formula 3> where a is 0, and $n_4$ is 3.

The LCD panel thus manufactured was observed with a polarizing microscope, and it was seen that the liquid crystal layer, with no electric field applied thereto, exhibited a complete dark state through the crossed polarizers.

Additionally, it was observed whether defects occur in the liquid crystal molecules at the time of switching on/off the LCD display device manufactured in the third embodiment, and, as a result, it was seen that the transition to a bright state was made without causing defects of the liquid crystal molecules.

The same experiment as that in the third embodiment was carried out using a photopolymerizable monomer compound represented by Formula 1-1 with a different value for $n_2$, a result of which is shown in Table 3:

TABLE 3

| $n_2$ | Initial Orientation Before Irradiation | Liquid Crystal Orientation After Irradiation | Pretilt Stabilization |
|---|---|---|---|
| 3 | Horizontal | Vertical | Yes |
| 5 | Horizontal | Vertical | Yes |
| 7 | Horizontal | Vertical | Yes |
| 9 | Horizontal | Vertical | Yes |

As can be seen from Table 3, the initial, random planar state is transitioned to a vertical orientation as the monomer compounds are photo-polymerized by light irradiation, and the pretilt angle is stabilized in a particular direction, so that the response time of the LCD panel becomes faster and the brightness and contrast ratio of the device are improved.

[Fourth Embodiment]

The LCD panel was manufacture according to the same method as in the first embodiment and evaluated the orientation of the liquid crystal molecules and switching characteristics of the device, except for that the LCD panel assembly was manufactured by injecting a composition for forming a liquid crystal layer thereinto, the composition for forming a liquid crystal layer being produced with the weight fraction of 99.0 wt % of liquid crystal host having negative dielectric anisotropy, and 5 wt % of a mixture of photopolymerizable monomer compound and photo-initiator having 2.0 wt % with respect to the photopolymerizable monomer compound, the photopolymerizable monomer compound being produced by mixing 50 wt % of a compound represented by Formula 5, and 50 wt % of a compound represented by Formula 3, where n is 18. In formulas below, A-group denotes photopolymerizable acryloyl group.

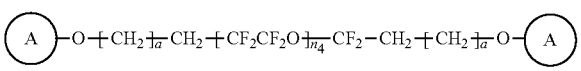

<Formula 5> where n is 6, 10, 14, 18 or 22

<Formula 3> where a is 0, and $n_4$ is 3.

The LCD panel thus manufactured was observed with a polarizing microscope, and it was seen that the liquid crystal layer, with no electric field applied thereto, exhibited a complete dark state through the crossed polarizers.

Additionally, it was observed whether defects occur in the liquid crystal molecules at the time of switching on/off the LCD display device manufactured in the fourth embodiment, and, as a result, it was seen that the transition to a bright state was made without causing defects of the liquid crystal molecules. The results can be seen from FIGS. 23 and 24.

Figure 23:
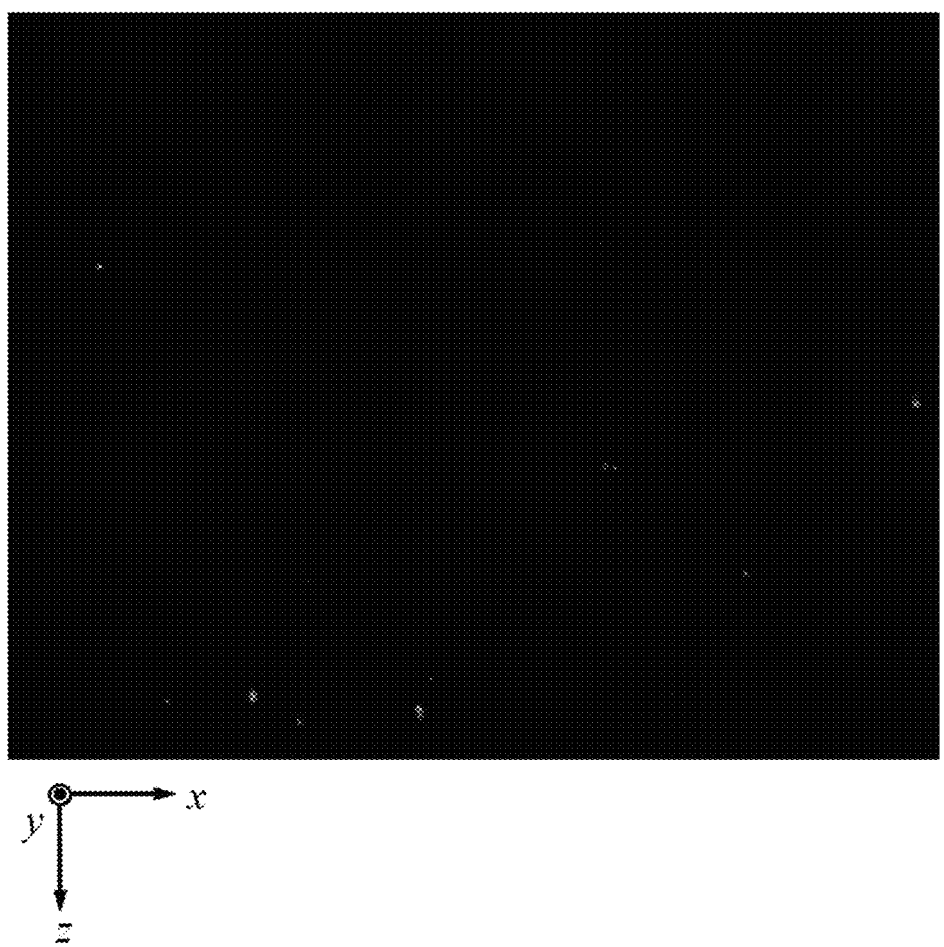
FIGS. 23 and 24 are photographs of an LCD panel manufactured according to a fourth embodiment after the light stabilization by UV irradiation, observed with a polarizing microscope through crossed polarizers, showing changes in transmittance before and after application of voltage, respectively.
Figure 24:
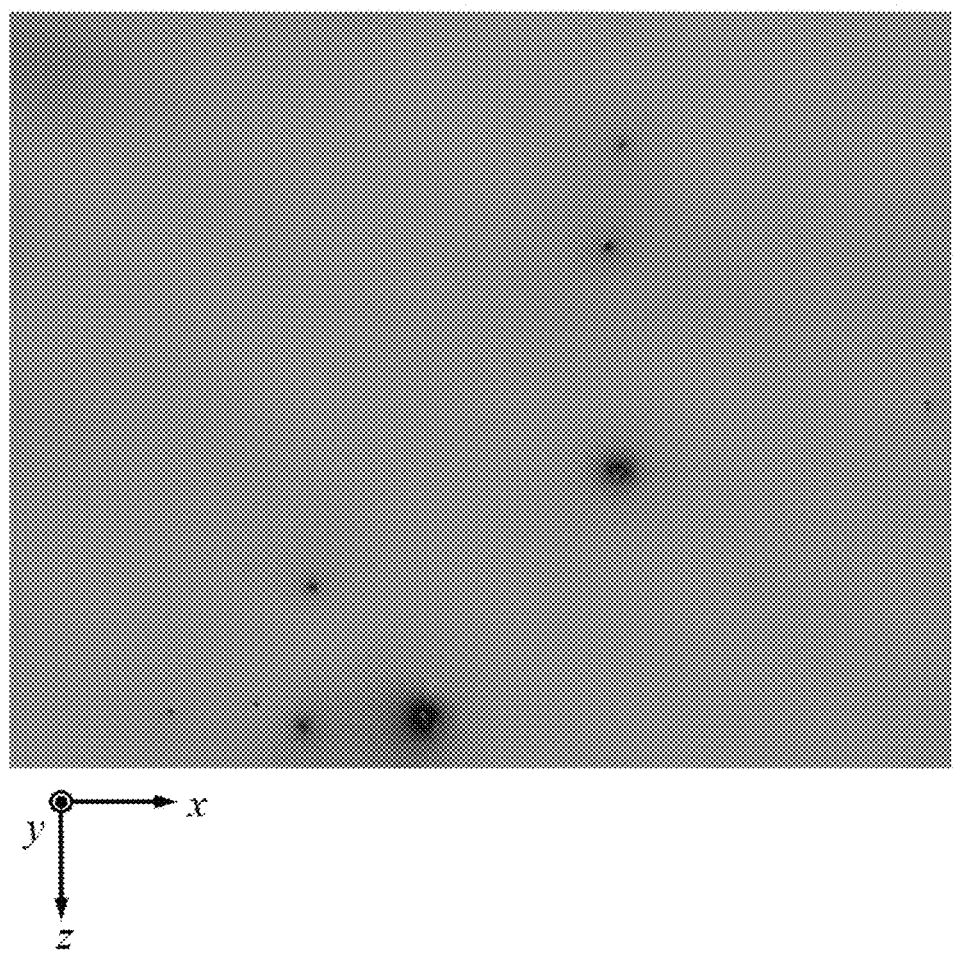

Upon applying electric field corresponding to the voltage level of 3V in an initial dark state as shown in FIG. 23, it was observed that the liquid crystal molecules reacted with the electric field to change the orientation. Accordingly, the optical axis of the liquid crystal molecules made the angle of 45 degree with the transmission axes of the polarizers on the surfaces of the respective display substrate, so that that the transition to a bright state was made as shown in FIG. 24 without causing defects of the liquid crystal molecules.

Further, the orientation of the liquid crystal molecules according to temperature change was observed while heating the sample in which the liquid crystal molecules are vertically aligned at room temperature. As a result, transition to the horizontal orientation was observed at about 89° C. to 89.5° C., and the transition to isotropic phase was completed at 90° C.

The same experiment as that in the forth embodiment was carried out using a photopolymerizable monomer compound represented by Formula 5 with a different value for n, a result of which is shown in Table 4:

TABLE 4

| n value | Initial Orientation Before Irradiation | LC Molecules Orientation After Irradiation | Orientation Transition Temperature (° C.) | Pretilt Stabilization |
|---|---|---|---|---|
| 4 | Horizontal | Horizontal | — | No |
| 8 | Horizontal | Vertical | 39~40 | Yes |
| 10 | Horizontal | Vertical | 58~60 | Yes |
| 14 | Horizontal | Vertical | 70~72 | Yes |
| 18 | Horizontal | Vertical | 89~89.5 | Yes |
| 22 | Horizontal | Vertical | 89~89.5 | Yes |

As can be seen from Table 4, although vertical alignment was not induced for the compound where n is 4, for the compound where n is equal to or larger than 8, the initial, random planar state is transitioned to a vertical orientation as the monomer compounds are photo-polymerized by light irradiation, and the pretilt angle is stabilized in a particular direction, so that the response time of the LCD panel becomes faster and the brightness and contrast ratio of the device are improved. It could also be seen that the orientation transition temperature from the vertical to horizontal orientation after irradiation increases with the value for n. This represents temperature stability of the vertical orientation. In other words, it can be seen that the orientation is more stable as the chain length of a compound represented by Formula 5 increases. The isotropic-nematic phase transition temperature of the host liquid crystal molecules used is 90.0° C.

[Fifth Embodiment]

The LCD panel was manufacture according to the same method as in the first embodiment and evaluated the orientation of the liquid crystal molecules and switching characteristics of the device, except for that the LCD panel assembly was manufactured by injecting a composition for forming a liquid crystal layer thereinto, the composition for forming a liquid crystal layer being produced with the weight fraction of 99.0 wt % of liquid crystal host having negative dielectric anisotropy, and 5 wt % of a mixture of photopolymerizable monomer compound and photo-initiator having 2.0 wt % with respect to the photopolymerizable monomer compound, the photopolymerizable monomer compound being produced by mixing 50 wt % of a compound represented by Formula 5, and 50 wt % of a compound represented by Formula 2, where n is 22. In formulas below, A-group denotes photopolymerizable acryloyl group.

<Formula 5>

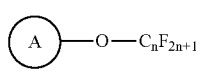

where n is 6, 10, 14, 18 or 22

<Formula 2>

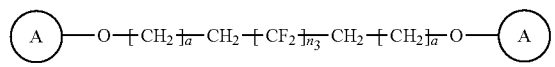

where a is 0, and $n_3$ is 6.

Figure 25:
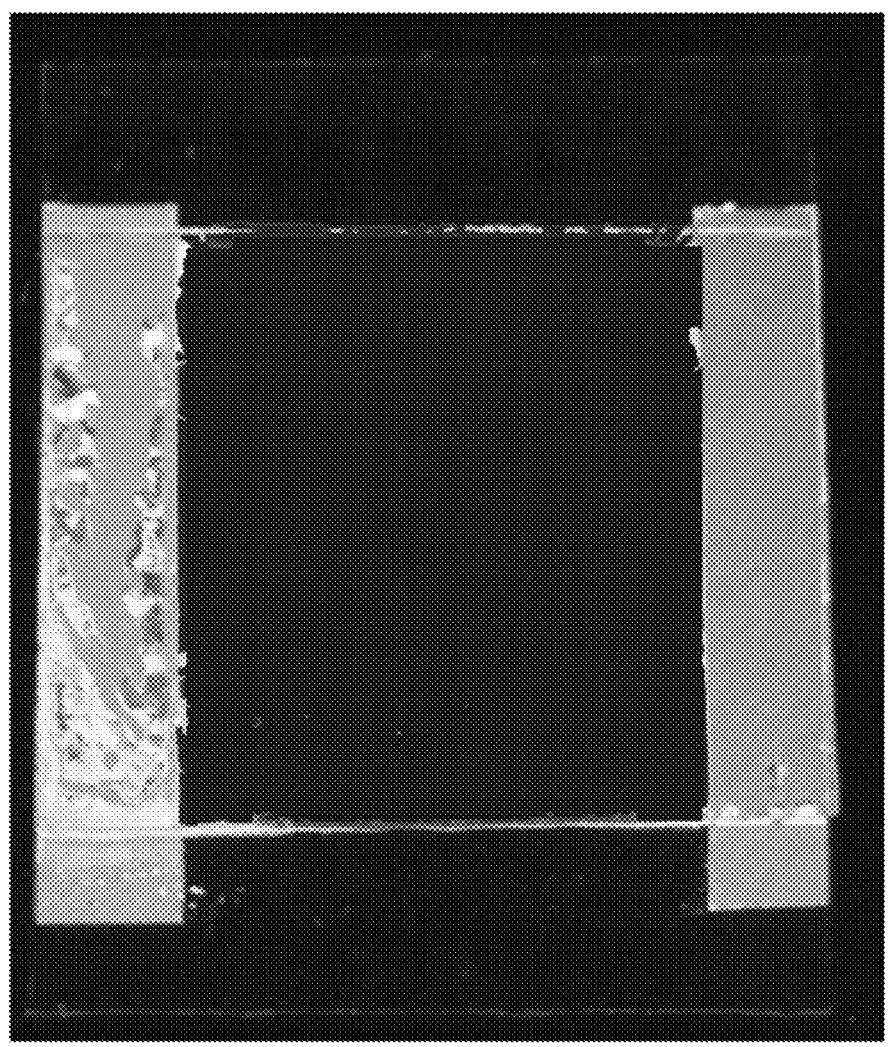
FIG. 25 is a photograph of an LCD panel manufactured according to the fifth embodiment, observed with a polarizing microscope.

The LCD panel thus manufactured was observed with a polarizing microscope, and it was seen that the liquid crystal layer, with no electric field applied thereto, exhibited a complete dark state through the crossed polarizers. FIG. 25 is a photograph of the LCD panel thus manufacture taken through the crossed polarizers; and FIG. 26 is a photograph taken with a polarizing microscope.

Additionally, it was observed whether defects occur in the liquid crystal molecules at the time of switching on/off the LCD display device manufactured in the fifth embodiment, and, as a result, it was seen that the transition to a bright state was made without causing defects of the liquid crystal molecules. The results can be seen from FIGS. 26 and 27.

Figure 26:
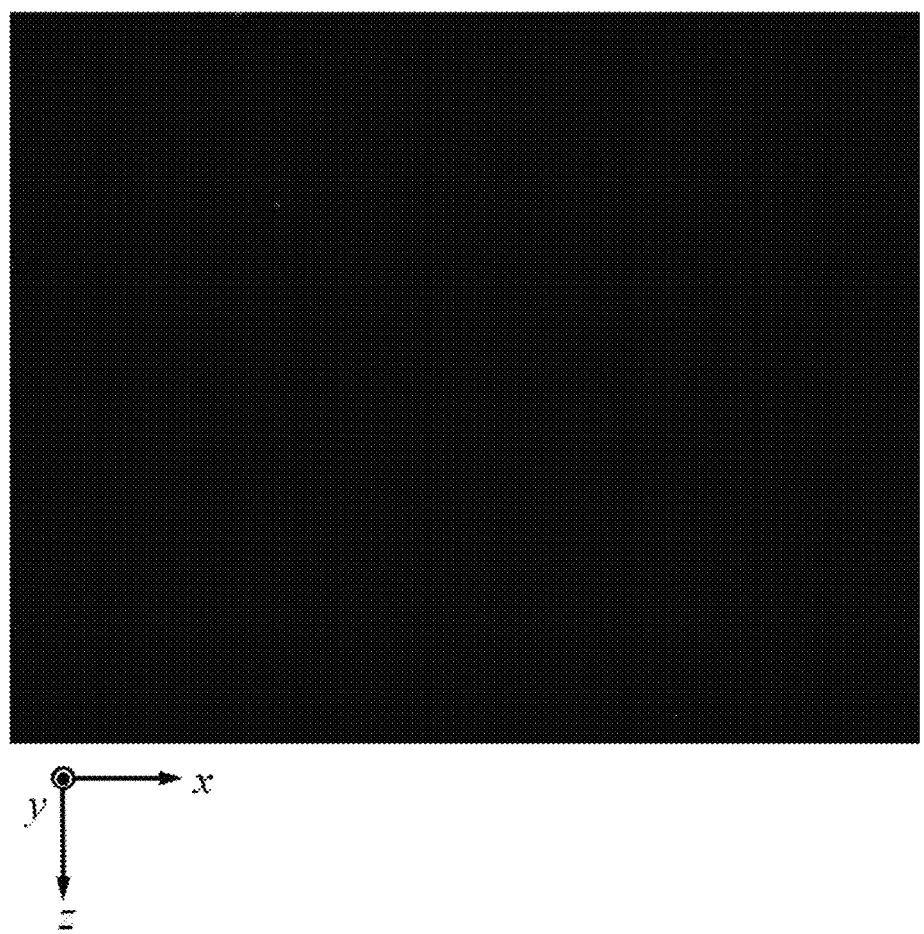
FIGS. 26 and 27 are photographs according to the fifth embodiment, observed with a polarizing microscope, showing changes in transmittance upon application of voltage.
Figure 27:
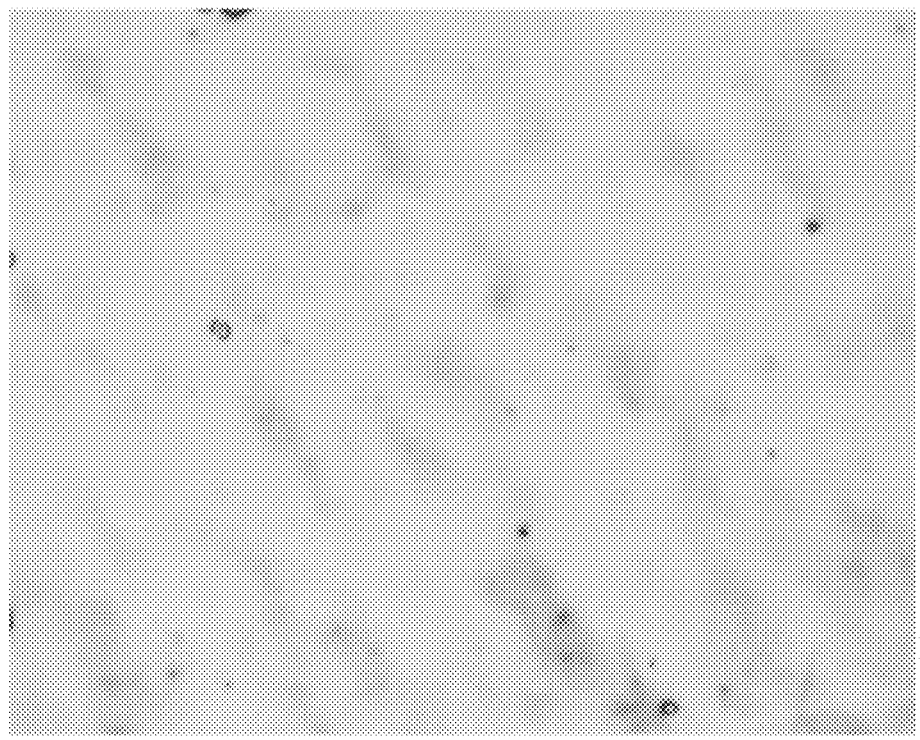

Upon applying electric field corresponding to the voltage level of 4V in an initial dark state as shown in FIG. 26, it was observed that the liquid crystal molecules reacted with the electric field to change the orientation. Accordingly, the optical axis of the liquid crystal molecules made the angle of 45 degree with the transmission axes of the polarizers on the surfaces of the respective display substrate, so that the transition to a bright state was made as shown in FIG. 27 without causing defects of the liquid crystal molecules.

The same experiment as that in the forth embodiment was carried out using a photopolymerizable monomer compound represented by Formula 5 with a different value for n, a result of which is shown in Table 4:

TABLE 5

| n value | Initial Orientation Before Irradiation | LC Molecules Orientation After Light Irradiation | Orientation Transition Temperature (° C.) | Pretilt Stabilization |
|---|---|---|---|---|
| 4 | Horizontal | Horizontal | — | No |
| 8 | Horizontal | Vertical | 40~45 | Yes |
| 10 | Horizontal | Vertical | 60~63 | Yes |
| 14 | Horizontal | Vertical | 72~75 | Yes |
| 18 | Horizontal | Vertical | 89~89.5 | Yes |
| 22 | Horizontal | Vertical | 89~89.5 | Yes |

As can be seen from Table 5, for the photopolymerizable monomer compound where n is 8 to 22, the initial, random planar state is transitioned to a vertical orientation as the monomer compounds are photo-polymerized by light irradiation, and the pretilt angle is stabilized in a particular direction, so that the response time of the LCD panel becomes faster and the brightness and contrast ratio of the device are improved.

[Sixth Embodiment]

An IZO (Indium Zinc Oxide) electrode, which has a micro-slit pattern of fish bones, was used as a pixel electrode in every pixel, while an unpatterned IZO electrode was used as a common electrode, so that the upper substrate are bonded to the lower substrate with the distance of about 4 μm therebetween, and a liquid crystal composition containing photopolymerizable monomer compound was injected in the same manner as that in the first embodiment without any alignment process.

A mixture was used as the liquid crystal composition, in which 99.0 wt % of liquid crystal host having negative dielectric anisotropy, and 1 wt % of a mixture of photopolymerizable monomer compound and photo-initiator having 2.0 wt % with respect to the photopolymerizable monomer compound were uniformly mixed, the photopolymerizable monomer compound being produced by mixing 50 wt % of a compound represented by Formula 5, and 50 wt % of a compound represented by Formula 2, where n is 18.

Light irradiation was carried out in the same manner as in the first embodiment to manufacture an LCD panel, and orientation of the liquid crystal molecules and switching characteristic were evaluated.

Figure 28:
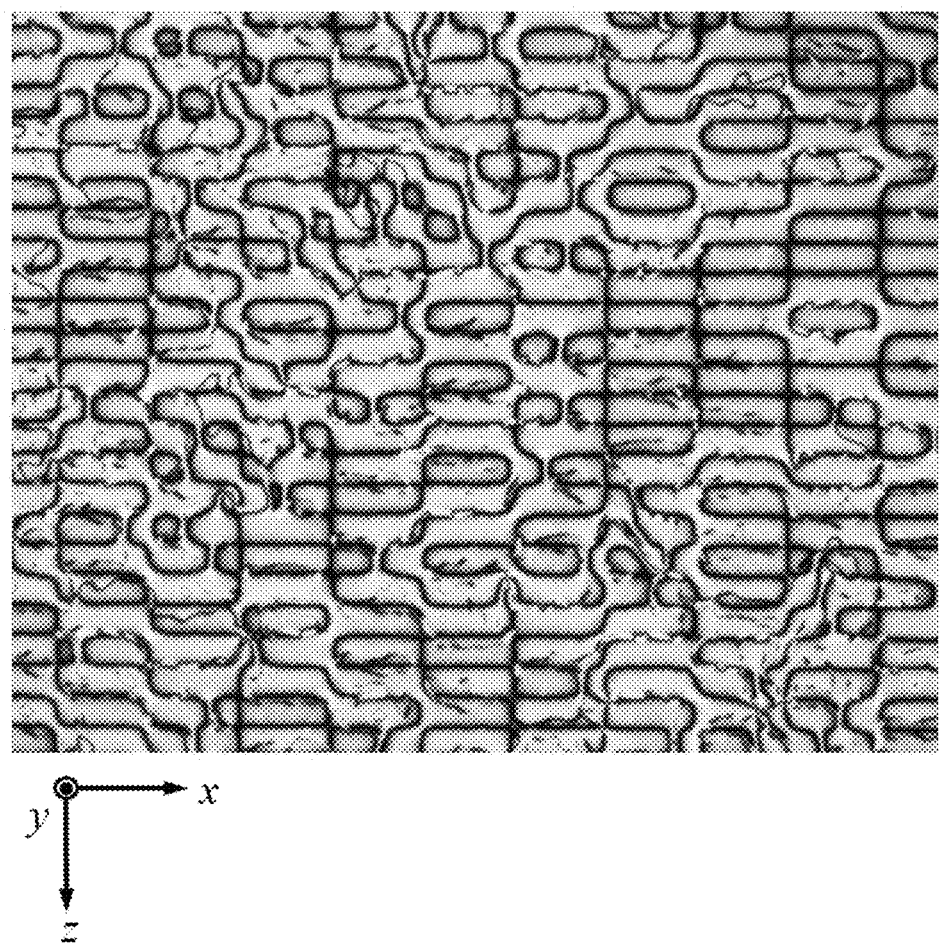
FIGS. 28 to 32 are photographs observed with a polarizing microscope, conoscopy images and photographs showing switching characteristics upon application of voltage of a manufactured liquid crystal device in each of the steps according to a sixth embodiment.

After the injection of the liquid crystal composition, the orientation of the liquid crystal molecules in the device was observed with a polarizing microscope while rotating the sample before light irradiation. As a result, it was seen that the liquid crystal molecules were not vertically aligned. In this instance, the liquid crystal molecules exhibited a random planar state as shown in FIG. 28.

Figure 29:
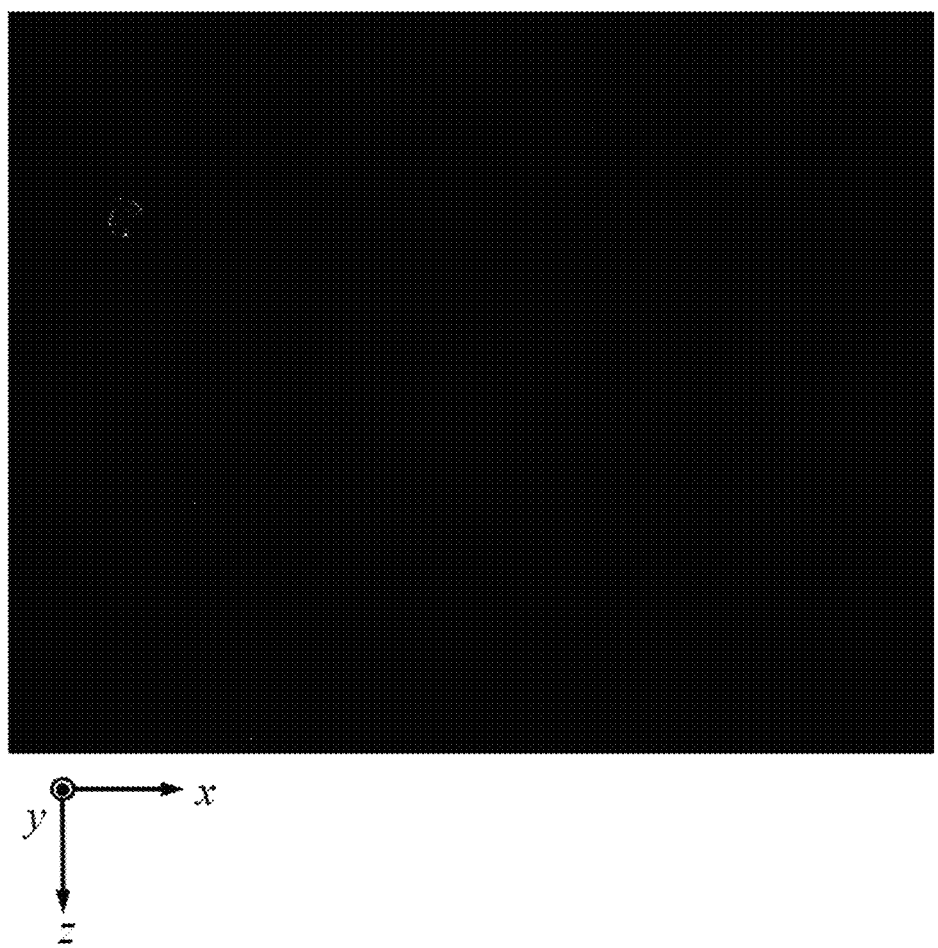
Figure 30:
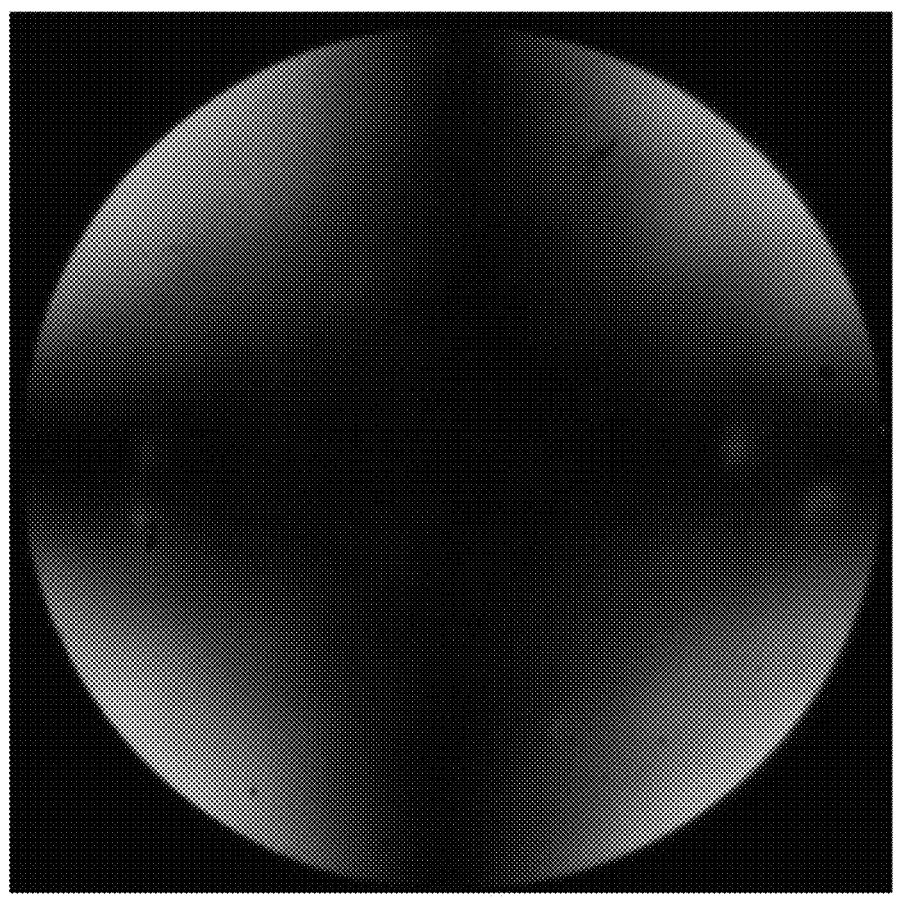
Figure 30:
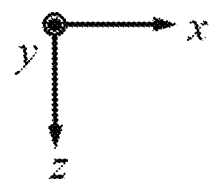

As a result of observing the LCD panel subjected to the first and second light irradiation with a polarizing microscope, it was seen that the liquid crystal layer of the LCD panel exhibited a completely dark state through the crossed polarizers as shown in FIG. 29. Further, as can be seen from the conoscopy image shown in FIG. 30, the liquid crystal molecules were aligned vertically with respect to the surfaces of the substrates.

In addition, an electric field of T80 (transmittance of 80% relative to the maximum transmittance) was applied to the LCD panel, and then the orientation of the liquid crystal molecules was observed. In this case, in a pixel divided into four domains with electrodes having a micro-slit (branch)

pattern, it was observed that transition was made quickly to a uniformly bright state without causing defects.

Figure 31:
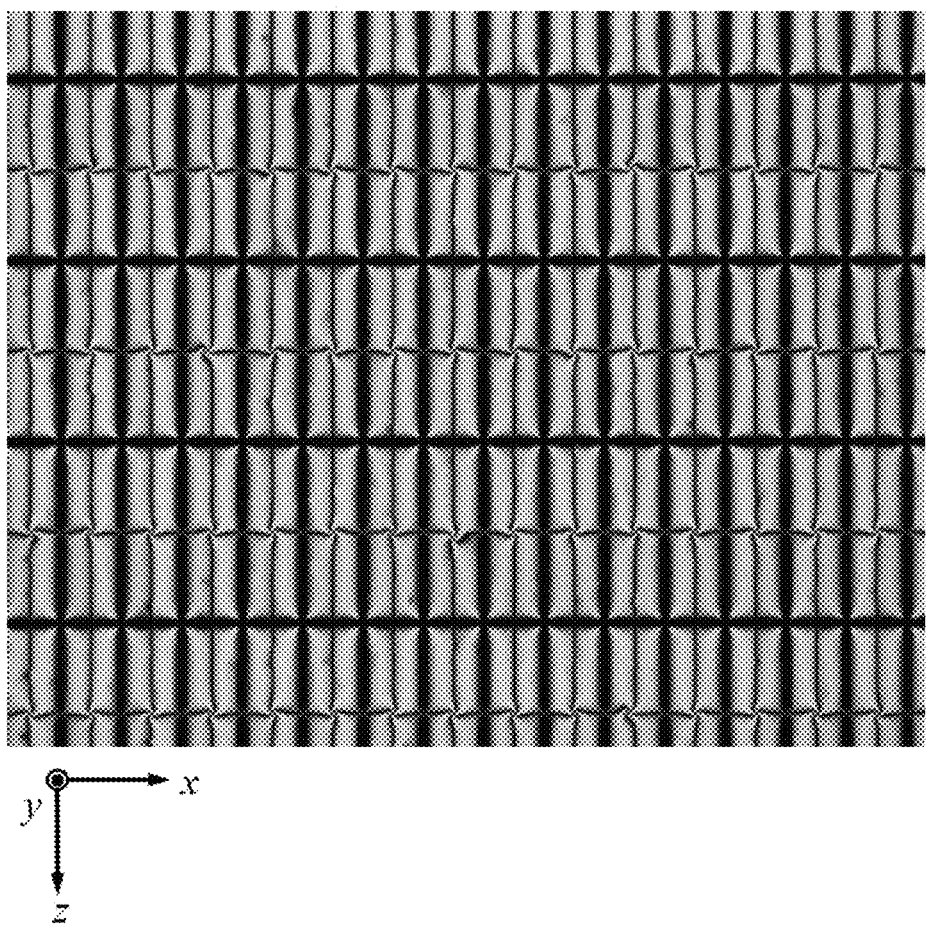
Figure 32:
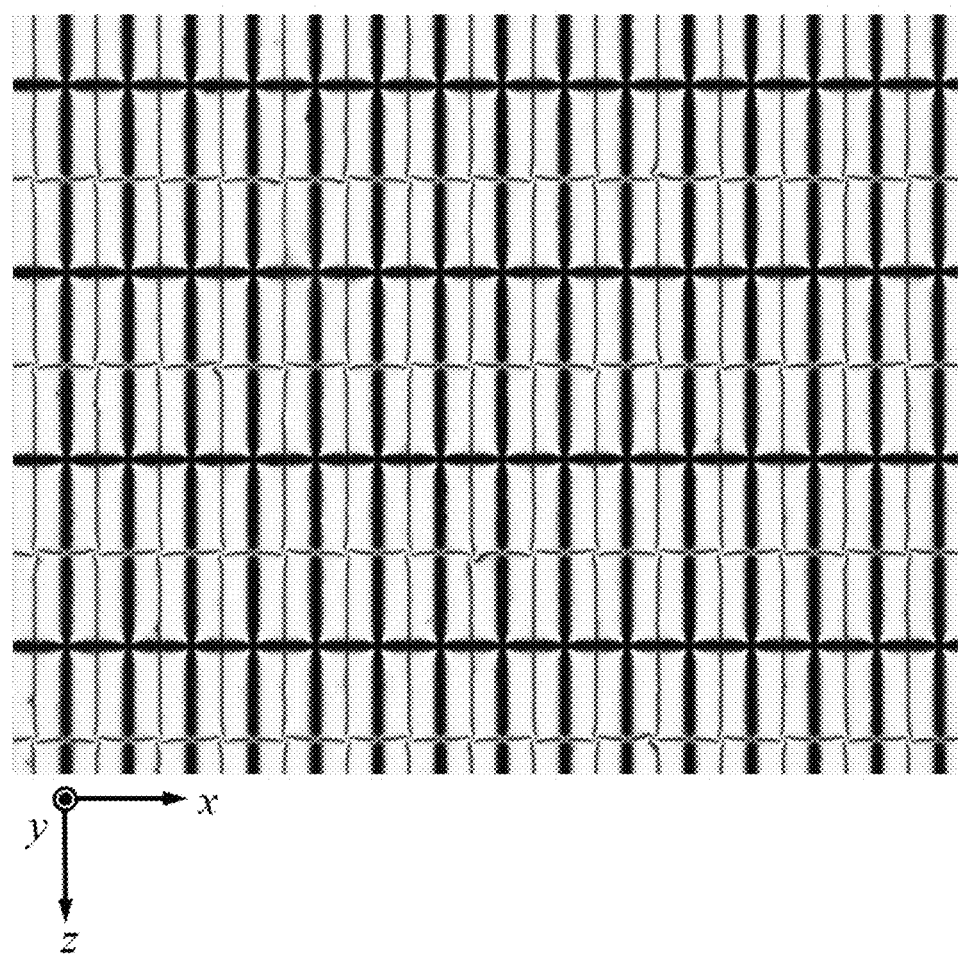

Upon applying electric field of T80 (transmittance of 80% relative to the maximum transmittance) in a dark or black state as shown in FIG. 29, it was observed that the liquid crystal molecules reacted with the electric field to change the orientation. Accordingly, in a pixel divided into four domains, the optical axis of the liquid crystal molecules made the angle of 45 degree with the transmission axes of the polarizers on the surfaces of the respective display substrates, so that the transition to a bright state was made quickly without causing defects of the liquid crystal molecules, as shown in FIGS. 31 and 32. This resulted from the surface stabilization of the orientation of the liquid crystal molecules in such a manner that the liquid crystal molecules in a pixel make pretilt angles in four different directions each making 45 degree with the transmission axes of the polarizers. By doing so, it was seen that the response speed of the liquid crystal molecules was improved while the brightness and the contrast ratio of the device was enhanced.

While the present invention has been particularly shown and described with reference to exemplary embodiments and examples thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A LCD panel, comprising:
   substrates facing each other;
   a liquid crystal layer disposed between the substrates; and
   liquid crystal alignment layers, each sandwiched between the liquid crystal layer and a respective one of the substrates,
   wherein each of the liquid crystal alignment layers comprises a non-polyimide hydrocarbon derivative having a perfluorocarbon group, and the liquid crystal layer comprises a monomer compound of the non-polyimide hydrocarbon derivative having a perfluorocarbon group.

2. The LCD panel of claim 1, wherein the perfluorocarbon group is at least one of perfluoroalkyl group having 1 to 50 carbon atoms and perfluoroalkoxy group having 1 to 50 carbon atoms.

3. The LCD panel of claim 1, wherein the hydrocarbon derivative having a perfluorocarbon group formed by polymerizing at least one of the compounds represented by Formulas 1 to 4:

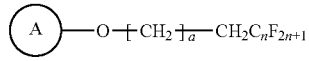
<Formula 1> where a is 0 or 1, n is a natural number from 1 to 11, and A is a photopolymerization reactive group,

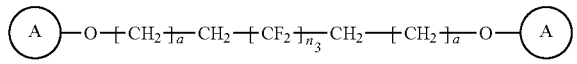
<Formula 2> where a is 0 or 1, $n_3$ is a natural number from 1 to 10, and A is a photopolymerization reactive group,

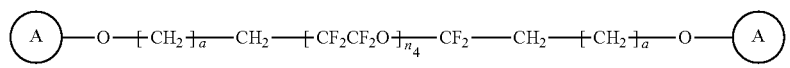
<Formula 3> where a is 0 or 1, $n_4$ is a natural number from 1 to 6, and A is a photopolymerization reactive group,

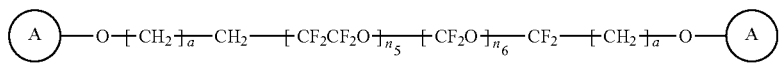
<Formula 4> where a is 0 or 1, $n_5$ and $n_6$ are natural numbers from 1 to 6, respectively, and A is a photopolymerization reactive group.

4. The LCD panel of claim 3, wherein the photopolymerization reactive group is (meth)acryloyl group.

5. A LCD panel, comprising:
   substrates facing each other;
   a liquid crystal layer disposed between the substrates; and
   liquid crystal alignment layers, each sandwiched between the liquid crystal layer and a respective one of the substrates,
   wherein each of the liquid crystal alignment layers comprises a non-polyimide hydrocarbon derivative having a perfluorocarbon group,
   wherein the hydrocarbon derivative having the perfluorocarbon group comprises at least one of the compounds represented by Formulas 1 to 4:

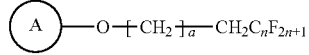
<Formula 1> where a is 0 or 1, n is a natural number from 1 to 11, and A is a photopolymerization reactive group,

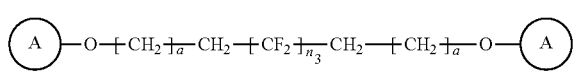
<Formula 2> where a is 0 or 1, n3 is a natural number from 1 to 10, and A is a photopolymerization reactive group,

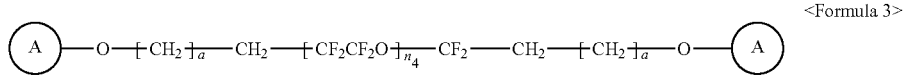

<Formula 3> where a is 0 or 1, n4 is a natural number from 1 to 6, and A is a photopolymerization reactive group,

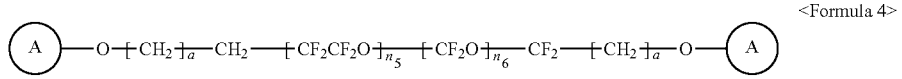

<Formula 4> where a is 0 or 1, n5 and n6 are natural numbers from 1 to 6, respectively, and A is a photopolymerization reactive group,
wherein the hydrocarbon derivative having the perfluorocarbon group comprises at least one mixture of at least one of the compounds represented by Formula 1 and at least one of the compounds represented by Formulas 2 to 4.

6. The LCD panel of claim 1, wherein the hydrocarbon derivative having a perfluorocarbon group comprises at least one of the compounds represented by Formulas 2 to 4 and at least one compound represented by Formula 5:

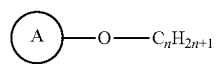

<Formula 5> where n is a natural number from 6 to 26, and A is a photopolymerization reactive group.

\* \* \* \* \*